(12) United States Patent
Khalvati et al.

(10) Patent No.: US 9,076,240 B2
(45) Date of Patent: Jul. 7, 2015

(54) SYSTEM, METHOD AND COMPUTER PROGRAM FOR AUTOMATED WINDOW MEMOIZATION

(76) Inventors: Farzad Khalvati, Richmond Hill (CA); Hamid R. Tizhoosh, Aurora (CA)

( * ) Notice: Subject to any disclaimer, the term of this patent is extended or adjusted under 35 U.S.C. 154(b) by 570 days.

(21) Appl. No.: 13/497,664

(22) PCT Filed: Sep. 24, 2010

(86) PCT No.: PCT/CA2010/001494
§ 371 (c)(1),
(2), (4) Date: Jul. 12, 2012

(87) PCT Pub. No.: WO2011/035424
PCT Pub. Date: Mar. 31, 2011

(65) Prior Publication Data
US 2012/0268471 A1    Oct. 25, 2012

Related U.S. Application Data

(60) Provisional application No. 61/245,897, filed on Sep. 25, 2009.

(51) Int. Cl.
| | |
|---|---|
| G06T 1/00 | (2006.01) |
| G06T 15/00 | (2011.01) |
| G06F 12/02 | (2006.01) |
| G06T 1/60 | (2006.01) |
| H04N 19/436 | (2014.01) |

(52) U.S. Cl.
CPC ............. *G06T 1/60* (2013.01); *H04N 19/436* (2014.11)

(58) Field of Classification Search
CPC ... G06T 1/00; G06T 1/60; G06T 9/00–9/008; G06T 15/00–15/005; G09G 5/36–5/366; G06F 12/00; G06F 12/02–12/0292
USPC .................. 345/522, 530, 555, 556, 564, 565
See application file for complete search history.

(56) References Cited

U.S. PATENT DOCUMENTS

| | | | | |
|---|---|---|---|---|
| 7,065,249 | B2 * | 6/2006 | Fushiki et al. | 382/167 |
| 8,615,389 | B1 * | 12/2013 | Marcu | 704/9 |
| 2003/0177442 | A1 * | 9/2003 | Lou | 715/513 |
| 2008/0162770 | A1 * | 7/2008 | Titiano et al. | 710/309 |
| 2009/0222461 | A1 * | 9/2009 | Alpern et al. | 707/100 |

OTHER PUBLICATIONS

Xiao et al. "Using Parallel Bloom Filters for Mulitattribute Representation on Network Services" IEEE Transactions on Parallel and Distributed Systems vol. 21, No. 1, pp. 20-32. Jan. 2010.*

(Continued)

*Primary Examiner* — Jacinta M Crawford
(74) *Attorney, Agent, or Firm* — Norton Rose Fulbright Canada LLP

(57) ABSTRACT

The present invention provides a system, method and computer program providing automated window memoization which is an automated optimization of image processing. The method comprises inputting to a memoization compiler an image set, hardware or software code implementing one or more image processing algorithms, and one or more design parameters. The memoization compiler processes the image set for the image processing algorithms and implements hardware or software code for optimizing the image processing algorithms based on the design parameters.

21 Claims, 10 Drawing Sheets

(56) References Cited

OTHER PUBLICATIONS

Khalvati, F "Computational Redundancy in Image Processing" a thesis presented to the University of Waterloo, issued Dec. 19, 2008; copyright 2008. cited in "Image Analysis and Recognition 5th International Conference ICIAR 2009" pp. 2, 25, 79, 83, 128, 163, 166, sections 2.4, 2.5, 4.2-4.2.3, 4.5.1.

* cited by examiner

US 9,076,240 B2

SYSTEM, METHOD AND COMPUTER PROGRAM FOR AUTOMATED WINDOW MEMOIZATION

PRIORITY CLAIM

This application claims the benefit of U.S. Patent Application No. 61/245,897, filed on Sep. 25, 2009, and which is incorporated herein by reference.

FIELD OF THE INVENTION

The present invention relates generally to image processing. The present invention relates more specifically to providing a memoization compiler or memoization module for automated window memoization which is an automated optimization of image processing.

BACKGROUND OF THE INVENTION

In recent years, as a result of advances in digital computers/cameras, image-processing algorithms have been widely used in applications including medical imaging, security and surveillance, navigation, multimedia and quality inspection. Many of these applications are used in real-time systems (with both soft and hard time constraints) where it is crucial to meet certain performance requirements. On the other hand, image-processing algorithms are usually computationally expensive.

Traditionally, software running on microprocessors and digital signal processors has provided adequate computational power to cope with the real-time image processing challenges, namely providing the results in real time. Nevertheless, as image resolution, complexity of algorithms, and the difficulty of the tasks increase, the conventional approaches of software implementations of image processing algorithms are increasingly unable to overcome these obstacles.

A common solution to meet the performance requirements of real-time image processing is to embed these algorithms in specialized digital hardware platforms (i.e. FPGA and ASIC). However, hardware design is more difficult and time consuming than coding software. Thus, in situations where a long time to market is not a viable option, the hardware approach may not be feasible. In addition, the specialized hardware approach usually involves significant capital investment to "re-tool" the manufacturing process to implement new hardware within the target device.

Currently, the machine vision and image processing end-product market is dominated by soft and hard real-time applications where it is imperative to meet the performance requirements. In hard real-time applications, such as a visual based vehicle navigation system, it may be fatal not to be able to process the incoming images quickly enough. In soft real-time systems, such as magnetic resonance imaging (MRI), although it is not fatal not to have a high-performance system, it is however important to increase the speed of the computations to enable greater patient throughput and, consequently, greater patient access to MRI-based diagnostics.

It is clear that improving performance for image processing applications has significant merit. Meanwhile, the general concept of memoization in computer programs has been around for a long time. Memoization is the idea to speed up computer programs by avoiding function calls that repeat the calculation of results for already processed inputs. Nevertheless, in practice, the general notion of memoization has not gained success due to the following reasons: 1) in software, the proposed techniques usually require detailed profiling information about the runtime behavior of the program which makes it difficult to implement, 2) in hardware, the memoization techniques have been mainly applied to processor design where the complexity of control circuitry and datapath makes it extremely difficult to benefit from reusing the results, and 3) the proposed techniques are usually generic methods which do not concentrate on any particular class of input data or algorithms. This significantly limits the overall performance improvement in both software and hardware.

What is required, therefore, is a means that is customized to image data and by which to implement memoization for image processing algorithms (in software) without the need to provide detailed profiling information about the runtime behavior of the program and to apply memoization to image processing algorithms implemented in digital hardware platforms (e.g. FPGA).

SUMMARY OF THE INVENTION

The present invention provides a computer-implemented method for providing automated window memoization, the method characterized by inputting to a memoization compiler an image set, comprising one or more images, input code implementing one or more image processing algorithms, and one or more design parameters, the memoization compiler operable to: (a) apply the one or more image processing algorithms to the image set; and (b) configure the one or more design parameters to optimize the one or more image processing algorithms by reducing computational redundancy when applying the one or more image processing algorithms to the image set.

The present invention also provides a system for providing automated window memoization, the system characterized by a memoization compiler having a plurality of inputs, the plurality of inputs enabling the input of an image set comprising one or more images, input code implementing one or more image processing algorithms, and one or more design parameters; wherein the memoization compiler is operable to: (a) apply the one or more image processing algorithms to the image set; and (b) configure the one or more design parameters to optimize the one or more image processing algorithms by reducing computational redundancy when applying the one or more image processing algorithms to the image set.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

Figure 1:
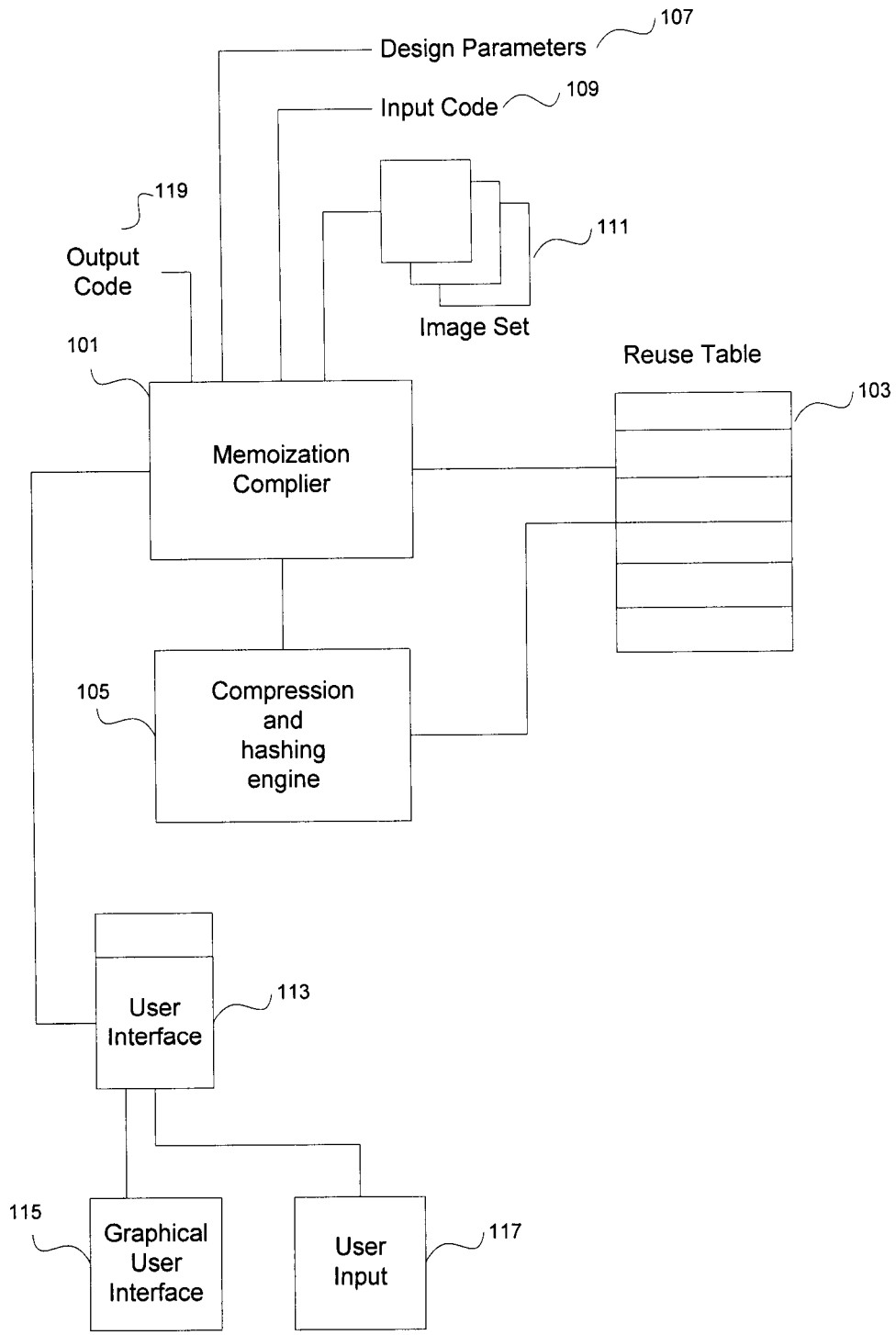
FIG. 1 illustrates a software-based memoization compiler in accordance with the present invention.

The present invention provides a system, method and computer program for automated window memoization. Automated window memoization is an automated optimization of image processing that is operable to speed up computations by eliminating or reducing redundant computations in image processing tasks. Real-time or near real-time image processing tasks can be achieved by implementing automated window memoization in accordance with the present invention.

Automated window memoization may be based on hardware and/or software implementations of window memoization. A memoization compiler may be provided for implementing automated window memoization in software. A memoization module may be provided for implementing automated window memoization in hardware. The memoization module may be implemented as a stand-alone hardware component or integrated with existing image processing hardware. The memoization module may, for example, by implemented at Register-Transfer-Level (RTL) using VHDL. In the description provided herein, the term "memoization compiler" is used to represent both the memoization compiler implementable in software and the memoization module implementable in hardware, unless it is understood that the reference is intended to apply to the software implementation only.

The memoization compiler may include functionality for automatically, or partly through user input or user intervention, obtaining input to a design phase. For example, a graphical user interface may be presented to an operator of the memoization compiler to obtain design parameters, processor and/or memory information, input code to optimize, and one or more input images for which optimization is desired. The input code may be a pre-existing implementation of one or more image processing algorithms, including algorithms known to a person skilled in the art. Such image processing algorithms may include spatial domain algorithms and transform-domain algorithms. Spatial domain algorithms deal with image pixels directly, while transform-domain algorithms work with the result of an image transform such as Fourier transform or Wavelet transform. Each category contains different subcategories. For example, the spatial domain includes point processing (mask operations performed on a pixel), local processing (mask operations performed on a local window of pixels) and global processing (mask operations performed on the whole image). Transform domain includes fourier transform (transforms the image into the frequency domain whereby the image is represented as the sum of sines and cosines of different frequencies each weighted with a different coefficient), discrete cosine transform (similar to Fourier transform but only uses cosines function to represent the image), and wavelet transform (transforms the image into a 2-dimensional domain of scale and space whereby the image is represented as the sum of some functions that are not necessarily sinusoidal).

The memoization compiler is particularly suited to spatial domain (in particular, local processing) algorithms. To perform an image processing task in spatial domain, usually a set of image processing algorithms are used in a chain. A chain contains different stages and each stage performs a set of calculations on a pixel (point processing), a local window of pixels (local processing) or the whole image (global processing) at each iteration.

Particular examples of image processing algorithms that can be optimized by the memoization compiler of the present invention include Canny edge detector, morphological gradient, Kirsch edge detector, Trajkovic corner detector, median filter, and local variance.

Local image processing algorithms that mainly deal with extracting local features in image (e.g. edges, corners, blobs) are increasingly used in many image processing applications such as texture recognition, scene classification, and robot navigation. The reason for popularity of these algorithms is that using local features of an image overcomes the need for high level algorithms where a semantic-level understanding of the image is required. The main drawback for local algorithms is that they are usually computationally expensive; a set of calculations must be repeated all over the image for numerous times.

The local image processing algorithms use a small neighborhood of a pixel in an image to process and produce a new gray level for the image in the location of the pixel. The size of local windows can vary based on the algorithm but for most algorithms the local windows contain 9 pixels (3×3 pixels) or 25 pixels (5×5 pixels). A local image processing algorithm applies a set of operations, which is called the mask operations set (f), to each window of pixels ($w_{ij}$) in the image to produce the response ($r_{ij}$) of the window.

$$r_{ij} = f(w_{ij}) \qquad (1)$$

As equation 1 indicates, in local image processing algorithms, the response of each local window $r_{ij}$ only depends on the pixels in the local window $w_{ij}$.

The image processing algorithms are implemented by input code provided to the memoization compiler.

The memoization compiler is operable to apply window memoization to optimize the real-time image processing performance of the input code for the one or more input images based on the other inputs. The memoization compiler may provide output code that embodies a specific window memoization routine or technique that is an optimization of the input code operable to provide improved performance to apply by other processing hardware or software.

The memoization compiler applies window memoization, which minimizes the number of redundant computations required by the image processing algorithms for the one or more images by identifying similar groups of pixels in the one or more images. Computations include applying the image processing algorithms to process an image, one or more segments of an image, or a set of one or more images.

A reuse table is included in or linked to the memoization compiler for storing the results of previously performed computations. When a set of computations is performed for the first time, they are performed and the corresponding results may be stored in the reuse table. When the same set of computations is performed again, the memoization compiler is operable to reuse the previously calculated result and the actual computations can be skipped. This eliminates the redundant computations and leads to high speedups.

The memoization compiler is operable to provide high speedups, particularly based on applying window memoization that optimizes one or more image processing algorithms that perform computations on segments of images. Being customized for the particular one or more image processing algorithms enables the memoization compiler to uniquely speed up the computations in practice where the general solutions of memoization have mostly failed to be useful in real implementations. The memoization compiler is operable to identify and reduce or eliminate computational redundancy in image-processing tasks and hence, significantly increase the performance of real-time image processing in both software and hardware platforms. The memoization compiler is operable to minimize the number of redundant computations performed on an image by identifying similar neighborhoods of pixels in the image. In particular, images that have redundancy in proximal segments of images (segments of images near each other) or in background segments of images may have greater redundancy. Therefore, automatically optimizing such image processing algorithms for these images leads to particularly high speedups.

The software-based memoization compiler of the present invention reduces the previously described disadvantages (e.g. cost) of implementing image processing algorithms on specialized embedded hardware systems. In many instances, the software-based memoization compiler can increase the ability of the pre-existing embedded processors to meet the performance requirements of real-time image processing systems that previously could only be achieved by hardware-based image processing systems. Embedded processors are increasingly used in medical applications that require high-performance computations. In radiology for example, due to limited processing power, handheld computers are currently used to merely display images. Providing the memoization compiler in handheld computers enables new possibilities for radiologists to run medical imaging software and report their diagnosis wherever they are. In hard real-time applications, such as controlling radiation devices for cancer treatment, it may be fatal to not be able to process the incoming images quickly enough. Therefore, current imaging device manufacturers can significantly extend the range of their performance profile and thus, open up new market applications without having to incur the significant cost and other disadvantages of re-tooling to embed specialized hardware. However, it is important to note that the hardware-based memoization module can also be used to speed up the calculations with significantly less hardware area than the prior art and hence, with less cost than conventional performance improvement methods. Moreover, it surpasses the performance limit imposed by the nature of digital hardware design called data-flow limit.

The input code representing the one or more image processing algorithms may also be referred to as a "core". The core, which may, for example, be written in software or hardware code such as C++ or HDL, may be provided to the memoization compiler along with the set of one or more input images. The memoization compiler is operable to optimize the core by automatically processing the image set for the core and then configuring the design parameters to maximize the performance gain obtained by window memoization for the existing algorithms. The memoization compiler can then apply the optimized core to the one or more input images.

FIG. 1 illustrates a software-based memoization compiler in accordance with the present invention. A memoization compiler (101) includes or is linked to a reuse table (103) and a compression and hashing engine (105). The reuse table (103) may be provided by a memory for storing the results of previously performed computations. One or more design parameters (107), input code (109) embodying one or more image processing algorithms and a set of one or more images (111) may be inputted to the memoization compiler (101). The memoization compiler (101) outputs output code (119) that embodies a specific window memoization routine or technique that is an optimization of the input code operable to provide improved performance to apply by other processing hardware or software, which is input to the memoization compiler. A user interface (113), which may include or be linked to a graphical user interface (115) and user input (117) for user intervention may also be provided, for example to initiate the optimization provided by the memoization compiler.

When a set of computations is performed by the memoization compiler (101) for the first time, they can be performed and the corresponding results may be stored in the reuse table (103), at a memory address determined by the compression and hashing engine (105). When the same set of computations is performed again, the memoization compiler (101) is operable to look up the previously calculated result from the reuse table (103) and reuse the result, enabling the memoization compiler to skip the redundant computation.

As previously mentioned, the memoization compiler is provided with a set of one or more input images for determining and optimizing one or more image processing algorithms embodied by a core. During optimization, the memoization compiler may consider one or more segments of each image, where each segment may be referred to as a window. Prior to applying the core to each window, the pixels, or groups of pixels, in each window may be analyzed and may be transformed, based on one or more design parameters, by the compression and hashing engine into a string, such as a binary string.

For a given algorithm, all windows or segments of pixels that generate the same result or response are mapped, based on the design parameters, by the compression and hashing engine to one string and one particular location in the reuse table. These windows of pixels may belong to one image (i.e. inter-frame redundancy) or to different frames of a volume data or video data (i.e. inter-frame redundancy). In both cases, the mechanism for reusing the previously calculated result may be the same, regardless of whether the windows of pixels belong to one image or to different images. In a hardware-based memoization module, a hardware mapping engine may compress the processed window data to into a memory location using any hardware memory mapping technique.

The input code (109) may embody one or more image processing algorithms that may be provided as a core written in a programming language, such as C++ for example. The one or more images may be representative input images that are believed or known to represent images for which the output code will be optimized. The memoization compiler configures the design parameters and processes the input images using the input code to maximize performance gain. The memoization compiler can determine the lowest time to execute the core, $t_{mask}$, for the input images (mask refers to the "mask operations" performed by an image processing algorithm) and select the design parameters corresponding to this lowest time.

After the memoization compiler has determined optimized design parameters, it sets the design parameters based on the optimized parameters and generates a new core, written in the programming language, embodying the window memoization technique applied to the existing algorithms.

The design parameters may include hit rate, memoization overhead cost and the measure of similarity and comparability.

The hit rate determines the percentage of the cases where a result can be reused. Images with simpler structures will yield a higher hit rate. The hit rate of an image is in fact determined by the computational redundancy of the image. The computational redundancy of an image is directly connected to the two basic redundancy of image: data and interpixel redundancy, which are discussed more fully below.

The memoization overhead cost, which will typically be different in hardware and software, is the extra time that is required by the memoization compiler to actually reuse a result.

The measure of similarity and comparability is a tolerance for enabling reuse of a previous result for a similar, but not equal, new image processing task. For example, a low similarity (high comparability) requirement will allow higher reuse while a high similarity (low comparability) requirement will allow lower reuse. To achieve high speedups, the hit rate should be maximized where the memoization overhead cost should be minimized. These are affected by defining an optimal measure of similarity and comparability, which may be set based on the design considerations, such as field of application, urgency, implementation in hardware or software, etc.

Different design options/constraints may have different effects on hit rate and memoization overhead cost and hence, on the efficiency of the memoization compiler's output code. The processor-memory performance gap of the system on which the memoization compiler is executed may have a direct relationship with the memoization overhead cost. By providing to the memoization compiler the processor information and/or memory information that is based on classing the processor and/or memory used in the implementation, an estimate of the processor-memory gap can be obtained. Typically, window memoization may provide the best results (i.e. maximum speedups) for systems where the processor-memory performance gap is minimal such as embedded processors and handheld computers. Other design options that affect the speedup are the memory mapping scheme and hash function (for mapping input data to a memory address to store and retrieve computation results to and from the reuse table) used by the memoization compiler. Both memory mapping scheme and hash function may effect the hit rate and the memoization overhead cost which affect the speedup. Another factor that affects the overall speedup is the complexity of the image processing algorithm that is to be optimized. Applying window memoization to a more complex algorithm will yield higher speedups.

The memoization compiler may dynamically change the above-mentioned design parameters by calculating the overhead cost and average hit rate for the processor and input images. The characteristics of the image processing algorithms can then be examined automatically to determine the optimal complexity of the comparability measure such that while high hit rates can be achieved, the memoization overhead cost does not overflow to degrade the speedup.

Figure 2:
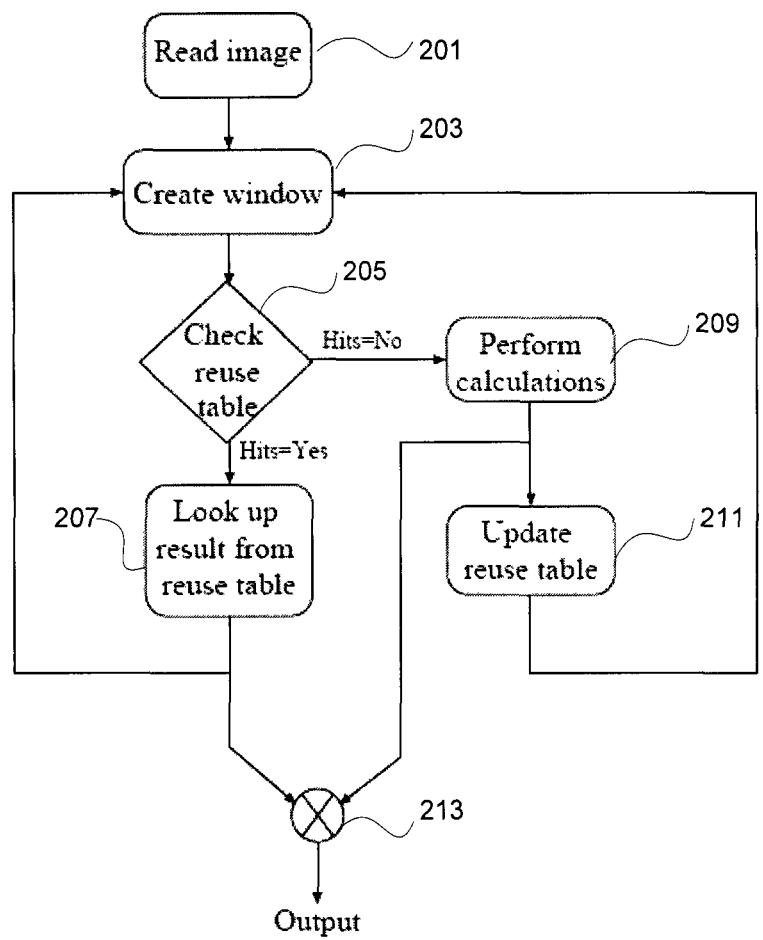
FIG. 2 illustrates a method for applying software-based window memoization.

FIG. 2 illustrates a method for applying software-based window memoization. The memoization compiler reads an input image (201) and creates a window (203) in the in the input image. The compression and hashing engine generates a string corresponding to the window and a reuse table location corresponding to the string, and checks whether a matching string is present at that location in the reuse table (205). If so, a hit occurs and the computation is looked up from the reuse table (207) and the actual computations (i.e. mask operations set) are skipped. Otherwise, a miss occurs, the mask operations set is applied to the window to calculate the result (209) and the reuse table is updated (211) with the string to which the window belongs and its response. The memoization compiler then proceeds to the next window in the input image or, if all windows have been processed, outputs the results (213).

The software-based memoization compiler combines the concepts of cache and hash table. Similar to cache, the memoization compiler uses a mapping scheme and an eviction policy to map incoming windows into the reuse table and, in case of a miss, to replace a string in the reuse table with the string of current window. Instead of using the string of the incoming window directly to generate the reuse table address, similar to a hash table, the memoization compiler uses a hash function to convert the string of the incoming window into an address which is within the range of the reuse table size. In general, the string is a large number (e.g. 36-bit) and it is impossible to have such a large reuse table that allocates one unique location for each value of strings. Thus, multiple strings may be mapped into one location in the reuse table. As a result, the string itself must be stored in the reuse table for the purpose of future comparisons. This leads to a reuse table whose elements contain three fields: valid bit, string, and the result (or response). The valid bit indicates whether the data stored in this address is valid. The string field represents the stored string. Finally, the outcome of applying the mask operations set to the window is stored in the result field.

In the memoization compiler, the compression and hashing engine first transforms an incoming window into its corresponding string. The string then is mapped by the compression and hashing engine into an address in the reuse table by building a key. Afterward, the content of the reuse table at the location where the key points to is read and compared against string of the incoming window. If string of the incoming window matches the content of the reuse table at that particular location, a hit occurs; the response is read from the reuse table and the mask operations set for the incoming window is skipped. If an incoming window is mapped into a location in the reuse table, which is either empty or already occupied by a string to which the incoming window does not belong, a miss will occur. In this case, the eviction policy used by window memoization selects a string in the reuse table to be replaced by the string corresponding to the incoming window. Moreover, the mask operations set of the algorithm is performed on the incoming window and the reuse table is updated by its response.

Similar to any performance improving technique, the speedup provided by the memoization compiler is defined as the ratio of the time required to process the original (or conventional) image processing algorithm ($T_c$) and the image processing algorithm with window memoization, ($T_w$).

$$\text{speedup} = \frac{T_c}{T_w} \quad (2)$$

In equation 2, $T_w$ and $T_c$ are normalized with respect to the total number of windows in image. The speedup is calculated by:

$$\text{speedup} = \frac{t_{mask}}{t_{memo} + (1 - HR_{sw}) \times t_{mask}} \quad (3)$$

where $HR_{sw}$ is hit rate, $t_{mask}$ is the time required to perform mask operations set, and $t_{memo}$ is the memoization overhead time.

Equation 3 indicates that the performance improvement provided by the memoization compiler (i.e. speedup) depends on three different parameters: $HR_{sw}$, $t_{mask}$, and $t_{memo}$. Hit rate ($HR_{sw}$) which itself depends on the memoization mechanism and the input image, has two effects on speedup. Increasing hit rate directly increases speedup and reduces $t_{memo}$, which also leads to a higher speedup. Therefore, hit rate is an important parameter in the performance improvement obtained by the memoization compiler.

The time required for mask operations set ($t_{mask}$), which depends on the complexity of the algorithm under study also has a positive relationship with speedup. The more complex the algorithm under study, the higher the achieved speedup will be. The memoization overhead time ($t_{memo}$) has a negative relationship with speedup. A higher $t_{memo}$ will cause speedup to decrease. The memoization overhead time results from multiple components: memory operations ($t_{read}$ and $t_{write}$), hit rate ($HR_{sw}$), comparison ($t_{compare}$), and key generation ($t_{key}$), which all depend only on the memoization mechanism, except $HR_{sw}$ which also depends on the input image.

As previously mentioned, the compression and hashing engine first generates a string for each window. The compression and hashing engine takes advantage of data redundancy in image processing to provide strings. Image processing exploits three types of redundancy in image data: psychovisual redundancy, coding redundancy, and interpixel or spatial redundancy. These characteristics of image data have been identified and exploited in the image compression research field where the main goal is to reduce the amount of data required to store, transmit, and/or represent an image. Nevertheless, the redundancy in image data has not been considered as a potential source for computational redundancy. Therefore, there is no explicit previous work on the relationship of the data redundancy and the computational redundancy of image data.

Psychovisual redundancy in an image exists because human vision does not weigh all the information coming from the image equally. Some parts of the image are considered to contain more important information than the other parts. The less important information is considered to be redundant since it is ignored by the human vision system. From the image compression perspective, a region of an image, which has psychovisual redundancy can be either omitted or represented using much less number of bits per pixel.

An image is said to contain coding redundancy if the number of bits per pixel that is required to represent the image is higher than is necessary. The coding redundancy of an image is measured based on the entropy of the image. Entropy is the average information of an image per pixel, which is calculated as:

$$H = -\sum_{i=0}^{GL-1} p_i \times \log_2 p_i \qquad (4)$$

where GL and $p_i$ are the number of gray levels and the probability of occurrence of gray level i in the image, respectively. For an image with GL gray levels, the sum of the average coding redundancy per pixel ($C_r$) and average information per pixel (entropy H) is a constant value:

$$C_r + H = \log_2(GL) \qquad (5)$$

In other words, for an image with a given number of gray levels (GL), the entropy of the image (H) determines the coding redundancy of the image ($C_r$).

$$C_r = \log_2(GL) - H \qquad (6)$$

Interpixel redundancy exists because much of information carried by each pixel is redundant with the information carried by the pixels around it. Mapping transforms convert an image into a new format where the interpixel redundancy of data has been eliminated. Each pixel in the transformed image contains the information that is carried solely by the corresponding single pixel in the original image.

In mapping transforms, the interpixel redundancy of a pixel is calculated with respect to a window of pixels that appears around the pixel in the image. Thus, the size of the window plays a role in defining the interpixel redundancy of an image. For example, the information that a pixel shares with a 3×3 window of pixels around it is different than that shared with a 5×5 window. The other issue in extracting the interpixel redundancy is the amount of weight that is given to the interpixel redundancy between a pixel and each neighboring pixel. The general form of a mapping transform, which extracts the information carried solely by the central pixels of windows is:

$$Img^{icp}(x,y) = \sum_{i=-m_1}^{m_1} \sum_{j=-m_2}^{m_2} \alpha_{ij} Img(x-i, y-j) \qquad (7)$$

In the equation above, icp stands for information at central pixel, $(2m_1+1) \times (2m_2+1)$ is the size of the windows, based on which the interpixel redundancy is calculated, and $\alpha_{ij}$ determines the weights given to the interpixel redundancy between a pixel and each neighboring pixel.

Once the mapping has been applied to an image, the entropy of the transformed image ($H^{icp}$) will measure the amount of information stored in the transformed image ($Img^{icp}$), which is usually much less than that stored in the original image ($H^{orig}$). The decrease in entropy reflects the removal of interpixel redundancy ($IP_r$) with respect to the transform used (icp) to generate the transformed image ($Img^{icp}$). Therefore, the interpixel redundancy of an image can be calculated as:

$$IP_r = H^{orig} - H^{icp} \qquad (8)$$

The windows of pixels are essential parts of designing or implementing local processing algorithms. When dealing with the windows of pixels in an image as the building blocks of the image, it is more convenient to consider the windows of pixels as a higher dimension gray levels or gray-level vectors. The gray-level vectors are the strings generated by the compression and hashing engine, and are defined based on the size of local windows. For windows of m×m pixels, an $m^2$-dimensional string represents all the windows in the image whose corresponding pixels are identical. In other words, a string represents all identical windows in the image. A window win belongs to (or matches) a string (or symbol) sym if each pixel in win is equal to the corresponding pixel in sym:

$$\forall pix \in win, \forall pix' \in sym, pix = pix' \Rightarrow win \in sym \qquad (9)$$

where pix and pix' are corresponding pixels of window win and string sym, respectively.

For local windows of 2 pixels, the possible number of 2-D strings will be 256×256=65536, assuming that the pixels in the original image have 256 gray levels. In general, for local windows of m×m pixels, the possible number of $m^2$-D strings will be $GL^{m^2}$ where GL is the number of gray levels in the original image. Strings are equal to normal 1-D gray levels when the size of local windows are one pixel.

Ignoring the geometry of objects in an image, for a given local window size, the image can be characterized by the probability of occurrences of strings in the image. Assume that a discrete random variable, $s_i$ in the interval [0,s), represents the strings of an image. The probability of occurrence of each string ($s_i$) in the image is:

$$P(s_i) = \frac{n_i}{n}, i = 0, 1, 2, \ldots, s-1 \qquad (10)$$

where s is the total number of strings in the image, $n_i$ is the number of times that the $i^{th}$ string appears in the image, and n is the number of total windows in the image.

The response of a mask, $r_{ij}$, solely depends on the pixels in the local window, $w_{ij}$, covered by the mask. All the windows in the image that contain similar pixels are identified by one string, $s_i$. Thus, for a given image processing algorithm, a string $s_i$ will produce the same response for $n_i$ times. This means that much of the mask operations sets that are applied to string $s_i$ are unnecessary or redundant.

Ideally, for each string in an image, the mask operations must be performed only once. Therefore, for a given image processing algorithm, the number of the mask operations sets that are absolutely necessary to apply to an image, in order to complete processing the image is equal to the number of strings present in the image.

The computational redundancy ($Comp_r$) of an image can be defined as the percentage of the mask operations sets that are not necessary to perform, in order to complete processing the image. In other words, the computational redundancy of an image indicates what percentage of mask operations sets are redundant. For each string $s_i$, only one set of mask operations is absolutely necessary. Thus, the rest of the mask operations sets, which are equal to $n_i-1$ are redundant. The number of the redundant mask operations sets for all strings in the image will be n–s. Thus, the percentage of the redundant mask operations sets in an image is:

$$Comp_r = \frac{n-s}{n} \qquad (11)$$
$$= 1 - \frac{s}{n}$$

where s and n are the total number of strings and the total number of windows in the image, respectively. It is seen that the computational redundancy depends on the total number of windows and the number of strings present in the image.

As mentioned before, it has been found that data redundancy in images leads to computational redundancy. The data redundancy of image is in fact the sum of the coding and interpixel redundancy of an image. It can be proven that the sum of the coding and interpixel redundancy of an image has a positive relationship with the computational redundancy of the image:

$$(C_r + IP_r) \propto^+ Comp_r \qquad (12)$$

In order to prove this relation, several intermediate steps must be proven, including:

1. proving that the sum of coding and interpixel redundancy of the original image has a negative relationship with the entropy of the transformed image (the transformed image is obtained by removing the interpixel redundancy among neighboring pixels):

$$(C_r + IP_r) \propto^- H^{icp} \qquad (13)$$

2. proving the entropy of the transformed image has a positive relationship with the standard deviation of the transformed image:

$$H^{icp} \propto^+ \sigma^{icp} \qquad (14)$$

and 3. proving that the standard deviation of the transformed image has a negative relationship with the computational redundancy of the image:

$$\sigma^{icp} \propto^- Comp_r \qquad (15)$$

which yields:

$$(C_r + IP_r) \propto^+ Comp_r \qquad (16)$$

This relationship provides useful information on the potential performance gain obtained by a memoization compiler for an image, only based on the coding and interpixel redundancy of the image.

From Equation 9, a window belongs to a string if all the pixels in the window are identical to the corresponding pixels in the string. By relaxing the equality requirement such that similar but not necessarily identical windows may belong to one string:

$$\forall pix \in win, \forall pix' \in sym, MSB(d,pix) = pix' \Rightarrow win \in sym \qquad (17)$$

where MSB(d,pix) represents d most significant bits of pixel pix in window win and pix' has d bits. In the ideal case (i.e. equation 9), d=8. By reducing d, windows that are similar but not identical are assigned to one string. From window memoization perspective, this means that the response of one window may be assigned to a similar but not necessarily identical window. As d decreases, more windows with minor differences are assumed equal and thus, the hit rate of window memoization increases drastically Assigning the response of a window to a similar but not necessarily identical window introduces inaccuracy in the result of the algorithm to which window memoization is applied. However, in practice, the accuracy loss in responses is usually negligible. It has been found that d is preferably from 1 to 8 and more preferably 4.

The compression and hashing engine extracts the d most significant bits of each pixel of a window to generate the corresponding string. The string is a number, which consists of chunks of the d most significant bits from pixels of the window. In general, it does not matter in which order the d most significant bits of each pixel appear in the string. However, to reduce the time required to generate strings, a certain order may be provided required, and is described below. To generate a string for each window of m×m pixels in the image, the d most significant bits of each pixel in the window are shifted and ORed with each other such that they build a d×m² bit number (d bits per pixel).

To gain better performance for the memoization compiler, the memoization overhead time ($t_{memo}$ and thus $t_{key}$) must be minimized, which means that the string of each window must be generated quickly. This can be accomplished by benefiting from the overlap between the neighbouring windows to build the string incrementally as the mask moves across the image. The pixels of each window may be used to generate its string in a left-to-right order. For all windows except the first windows in each row, the pixels that belong to the leftmost column in the window can be removed from the string and instead, the pixels that belong to the new rightmost column can be added to the string. By taking advantage of overlapping windows, for each window, only m shift and OR operations are needed in order to build string.

Once the string of an incoming window is generated, the compression and hashing engine maps the string to an address of the reuse table. Once again, a mapping scheme must be chosen such that the overhead time is small. Different mapping algorithms have been developed and used in processors cache hierarchy design including direct-mapped, fully associative, and set-associative.

Direct-mapped mapping performs a many-to-one mapping, always mapping a particular string to a single location. Fully associative mapping performs an any-to-any mapping between the incoming windows and the addresses of the reuse table. Accordingly, a string can reside anywhere in the reuse table and thus, in order to find a match between an incoming window and the stored strings, the whole reuse table must be searched. Set associative mapping is a combination of direct-mapped and fully associative methods. In set associative mapping, first, a string is mapped to a range of addresses in the reuse table, similar to direct-mapped method. Afterward, the string can be stored in any address, which is in that range, similar to fully associative method. In set associative and fully associative methods, a heuristic must be used in order to decide where to store the string of the incoming window and which address to evict.

Fully associative mapping and set associative mapping require many memory and comparison operations (i.e. high $t_{read}$, $t_{write}$, and $t_{compare}$). The serial nature of software leads to a very poor performance for window memoization that uses fully associative or set associative methods as the mapping scheme. In other words, these two schemes yield very high $t_{memo}$ such that in equation 3, for any normal range of values (i.e. $t_{mask}$ and $HR_{sw}$), it almost becomes infeasible to achieve speedups higher than 1. As a result, the compression and hashing engine preferably uses direct-mapped mapping for generating an address.

The compression and hashing engine also provides a hash function to convert each string into a smaller number hash key, which is in the range of the reuse table size. If the reuse table provides fewer memory locations than the number of possible keys, this will cause more than one string to be mapped to each location in the reuse table leading to collisions. In conventional hashing schemes in software, one generally solves the collisions by two major methods: open addressing and chaining. Both methods, however, impose an extra overhead time to the memoization mechanism (higher $t_{read}$, $t_{write}$, and $t_{compare}$). Moreover, when a collision occurs in the reuse table, the conventional mask operations set can be performed on the window to obtain the response. This is in contrast to conventional hashing methods where the goal is to find a target in the hash table and there is no alternate in case of a collision. As a result, it is more beneficial for the compression and hashing engine to consider collision as a miss and hence, to perform the mask operations set if a collision occurs, rather than employing conventional collision resolution methods.

There are two commonly used hash functions: division method and multiplication method. It has been found that the multiplication method gives a smaller $t_{key}$ than the division method. This is mainly due to the fact that the multiplication method uses inexpensive operations (i.e. shift) while the division method uses an expensive operation (i.e. mod function). The multiplication method has also been found to provide higher hit rates than the division method. For a given processor and the reuse table size, if the multiplication method gives both higher hit rate and lower $t_{key}$, which is true in most cases, then the speedup for the multiplication method will be higher than that of the division method. Therefore, the compression and hashing engine preferably uses the multiplication method as the hash function for the software implementation of window memoization.

As mentioned before, the speedup obtained by a software-based memoization compiler can be determined by:

$$\text{speedup} = \frac{t_{mask}}{t_{memo} + (1 - HR_{sw}) \times t_{mask}} \quad (18)$$

Equation 18 indicates that for a given algorithm and image, in order to calculate speedup, the memoization overhead time ($t_{memo}$) must be known. $t_{memo}$ depends on different parameters: $t_{key}$, $t_{read}$, $t_{write}$, $t_{compare}$ and $HR_{sw}$. $t_{key}$, $t_{read}$, $t_{compare}$, and $t_{write}$ are the times to build the string and key based on the incoming window, read the corresponding string from the reuse table, compare it to the current string, and store the result and new response in the reuse table, if necessary.

Based on these parameters, the memoization compiler is linked to a compression and hashing engine that uses the multiplication method for hash function in a direct-mapped style for mapping the strings of incoming windows into the reuse table can be provided.

$t_{memo}$ may be modeled by a quadratic equation that can be simplified such that by using the empirical data for only two extreme cases of images in a data set, $t_{memo}$ can be predicted for all images in the data set. The modified speedup equation can then be used to pick the optimal reuse table sizes to achieve maximum speedup for each case study algorithm.

$t_{memo}$ has the following components: $t_{key}$, $t_{read}$, $t_{compare}$, and $t_{write}$. It is seen that $t_{key}$, $t_{read}$, and $t_{compare}$ are all independent of hit rate $HR_{sw}$. However, $t_{write}$ is the only parameter that can be affected by hit rate. The nonlinear behavior observed in the empirical data of $t_{memo}$ versus hit rate is due to the write operation, which is reflected as $t_{write}$ in $t_{memo}$. When a miss occurs in window memoization, the mask operations set is applied to the current window and the string of the window along with its response are written to the reuse table. This causes the caching mechanism of the processor to update all copies of the reuse table that reside in different cache levels. Updating a data block in a cache hierarchy may be done by either write-through or write-back method. In a write-through cache, a write to a cache is propagated through all levels of the cache once a block of data in the highest level of cache is updated. In a write-back cache, updating the lower levels of cache is delayed until it is necessary. In either case, updating the cache may cause the pipeline to stall due to data hazards leading to the nonlinear effect of $t_{write}$ on $t_{memo}$. On the other hand, increasing hit rate decreases the number of cache updates that the pipeline must perform. Thus, $t_{memo}$ has a nonlinear relationship with $HR_{sw}$.

Therefore, $t_{memo}$ can be modeled by a nonlinear equation:

$$t_{memo}(HR_{sw}) = -a \times HR_{sw}^2 - b \times HR_{sw} - c \quad (19)$$

A goal of modeling the memoization overhead time ($t_{memo}$) is to predict speedup for images in a data set with the minimum required information. This enables quickly picking the optimal reuse table sizes that yield maximum speedups. The equation of speedup (equation 18) indicates that for a given image processing algorithm, in order to predict the speedups for images of a data set, three parameters are required for each image: $t_{mask}$, $t_{memo}$, and $HR_{sw}$. $t_{mask}$ is usually similar for different images in a data set since it depends on the complexity of the algorithm. Thus, to calculate speedup, measuring $t_{mask}$ for only two images is usually sufficient. The current nonlinear model of $t_{memo}$ requires that memoization overhead time be measured for at least three images in the data set because there are three parameters (a, b, and c) in equation 19. The model can be simplified such that it requires measuring $t_{memo}$ for only two images of a data set, in order to predict $t_{memo}$ for all images in the data set. With this simplification, to predict $t_{memo}$ for all images in a data set, the only parameter that is required to be calculated for all images is hit rate $HR_{sw}$. Hit rate is a characteristic of image and is independent of the processor on which window memoization is run. Thus, a high level model can be used to calculate the hit rates of all images easily.

The current equation for memoization overhead time is:

$$t_{memo}(HR_{sw}) = -a \times HR_{sw}^2 - b \times HR_{sw} - c \quad (20)$$

Assuming that the hit rate of all images in the data set is known, it is seen that to calculate the coefficients of the quadratic equation in 20 (i.e. a, b, and c), at least three images are required to measure $t_{memo}$. To reduce the minimum number of images required, we simplify equation 20 to:

$$t_{memo}(HR_{sw}) = -a \times HR_{sw}^2 - b \quad (21)$$

In order to determine the coefficients of the equation above (i.e. a and b), it is only required to measure $t_{memo}$ for two images. To obtain a better accuracy of model, two images with extreme hit rates are selected: images with minimum and maximum hit rate. To predict $t_{memo}$ for all images in a data set, first, $t_{memo}$ is measured for two images with extreme hit rates in the data set. By having $t_{memo}$ for two images, the coefficients of equation 4.18 (a and b) can be determined. By having a and b determined, for any image in the data set (i.e. any $HR_{sw}$), $t_{memo}$ can be calculated. The equations below show how a and b are calculated based on the memoization overhead times of images with maximum and minimum hit rates in a set of images.

$$a = \frac{t_{memo1} - t_{memo2}}{HR_{sw2}^2 - HR_{sw1}^2} \quad (22)$$

$$b = -t_{memo1} - a \times HR_{sw1}^2 \quad (23)$$
$$= -t_{memo1} - \left(\frac{t_{memo1} - t_{memo2}}{HR_{sw2}^2 - HR_{sw1}^2}\right) \times HR_{sw1}^2$$

where the subscripts 1 and 2 indicate $t_{memo}$ and $HR_{sw}$ of images with minimum and maximum hit rates, respectively.

To validate this simplified model for $t_{memo}$, equation 21 can be used to perform curve fits for the empirical data of $t_{memo}$ for a set of 40 natural images. The simplified model for $t_{memo}$ can be validated by comparing the model with the empirical data using the RMSEs (Root Mean Squared Error) of the curve fits (Table 1).

As it can be seen, the model matches the empirical data with reasonably low error (i.e. average RMSEs less than 4%)

Figure 8:
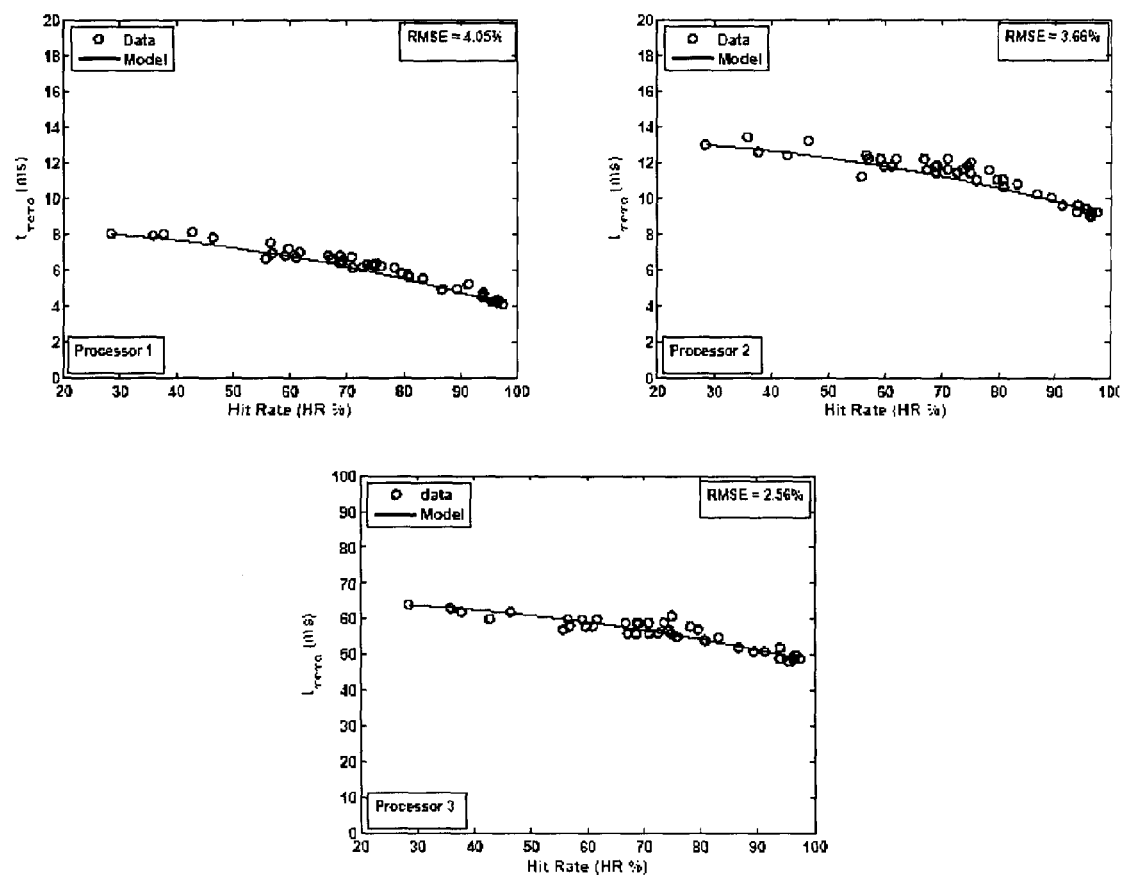
FIG. 8 illustrates the experimental data and the simplified quadratic equation used to model the data for three processors using a 16K reuse table.

FIG. 8 illustrates the experimental data and the simplified quadratic equation used to model the data for three processors using a 16K reuse table. This model only uses two extreme case images for curve fit.

Figure 9:
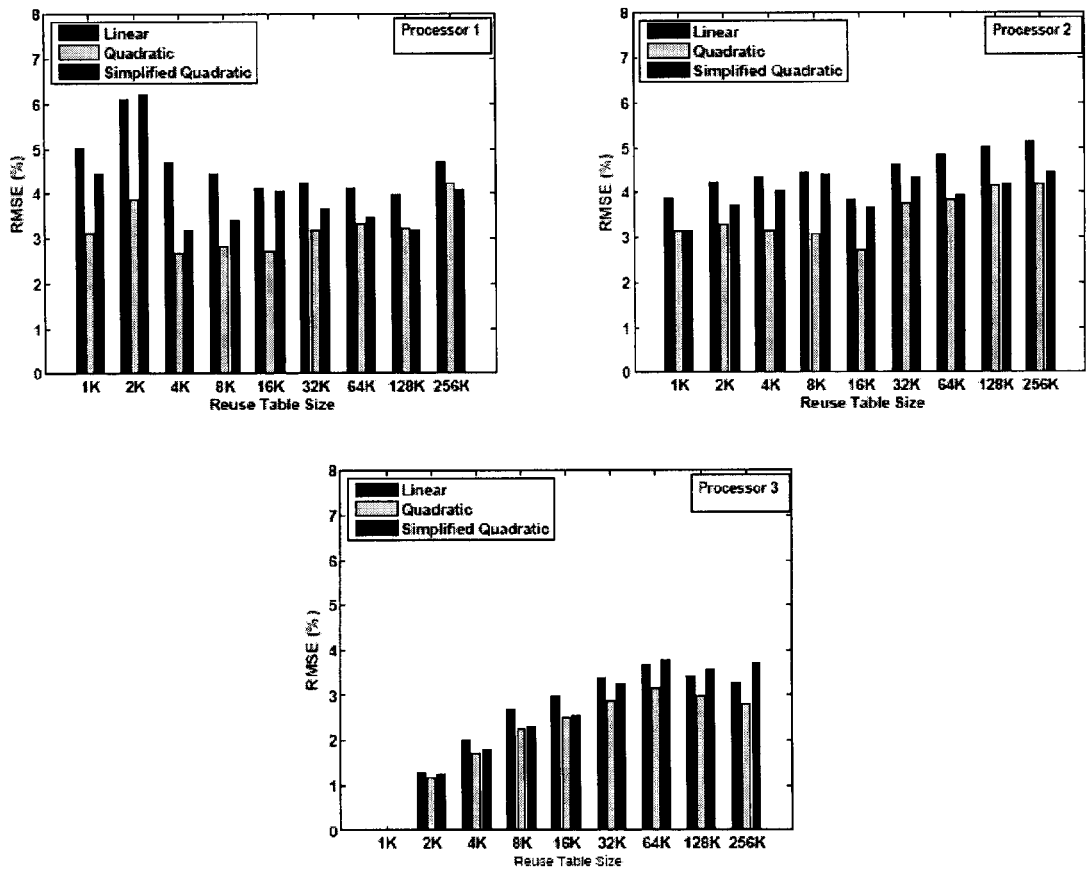
FIG. 9 illustrates the RMSEs of all three models (linear, quadratic, and simplified quadratic) for different reuse table sizes and three processors.

FIG. 9 illustrates the RMSEs of all three models (linear, quadratic, and simplified quadratic) for the memoization overhead time for different reuse table sizes and three different processors. It is seen that the quadratic model gives the best accuracy and in most cases, the simplified quadratic model gives more accurate result than the linear model.

Accuracy of window memoization for an algorithm can be evaluated by comparing the output of window memoization against the reference image calculated by a conventional implementation of the algorithm (i.e. without memoization). For binary output images (i.e. Canny edge detection, Morphological gradient, Kirsch edge detection, and Corner detection) misclassification error (equation 4.24) can be used to calculate the percentage of the background pixels that have been assigned to foreground incorrectly and vice versa. In Equation 24, $B_{Ref}$ and $F_{Ref}$ are the reference edge/corner map background and foreground, respectively; and $B_{Test}$ and $F_{Test}$ are the background and foreground of the window memoization result, respectively.

$$ME = 1 - \frac{|B_{Ref} \cap B_{Test}| + |F_{Ref} \cap F_{Test}|}{|B_{Ref}| + |F_{Ref}|} \quad (24)$$

For algorithms with gray-level outputs (i.e. median filter and local variance), signal-to-noise ratio can be used. It can therefore be shown that a high accuracy can be obtained by the memoization compiler. As for the empirical results obtained by window memoization in software, on average, the typical speedups range from 1.2 to 7.9 with a maximum factor of 40.

A hardware-based memoization module, at high level, is substantially similar to the memoization compiler described above, however the input core and output core may be written in HDL (hardware description language). In hardware, window memoization may be implemented as an n-wide superscalar pipeline. Examples are provided herein for a 2-wide superscalar pipeline. However it should be understood that the superscalar pipeline may be n-wide (for example, 4, 8 16-wide, etc.). Conventional 2-wide superscalar pipelines require twice the hardware of a scalar pipeline (i.e. two cores). In contrast, the superscalar pipeline of the present invention only needs extra hardware to implement the reuse table and can be therefore provided in one core.

As described above, the hit rate is determined by the computational redundancy of the image. Another design parameter affecting the hit rate in a hardware-based memoization module is core latency. The core latency is the number of cycles that it takes for the core (i.e. the original algorithm) to generate the output for an input window of pixels. If the given core has a high latency, the memoization module may fail to be able to use results that are potentially reusable.

TABLE 1

| Processor/$RT_{size}$ | 1K | 2K | 4K | 8K | 16K | 32K | 64K | 128K | 256K | Average |
|---|---|---|---|---|---|---|---|---|---|---|
| Processor 1 | 4.45 | 6.20 | 3.19 | 3.39 | 4.05 | 3.67 | 3.46 | 3.19 | 4.07 | 3.96 |
| Processor 2 | 3.15 | 3.72 | 4.06 | 4.42 | 3.66 | 4.33 | 3.92 | 4.18 | 4.45 | 3.99 |
| Processor 3 | 0.00 | 1.23 | 1.79 | 2.30 | 2.56 | 3.22 | 3.78 | 3.57 | 3.72 | 2.48 |

Similar to the software-based memoization compiler, the computational redundancy of an image in hardware is directly connected to the two basic redundancies of images: data and interpixel redundancy. Hit rate is affected by the mapping scheme used to map the incoming windows to the reuse table. A good mapping scheme yields high hit rate while maintaining the cost at minimum overhead time.

Another design parameter for a hardware-based memoization module is the hardware area overhead cost, which is the extra hardware required by the memoization module. In particular, it is desirable to minimize the area used by the reuse table.

Similar to the software-based memoization compiler, the measure of similarity or comparability for pixel neighbourhoods (windows) plays a significant role in the efficiency of the memoization module. The same techniques used for the software-based memoization compiler can be used for hardware-based memoization module.

These hardware-based design parameters can be configured statically. Handling the mapping scheme, core latency, and optimized reuse table (in terms of hardware area) statically means that the memoization compiler has a priori knowledge on how to make this design. The similarity measure, similar to the software-based memoization compiler, can be configured dynamically based on the input images and the image processing algorithm (core).

Figure 3:
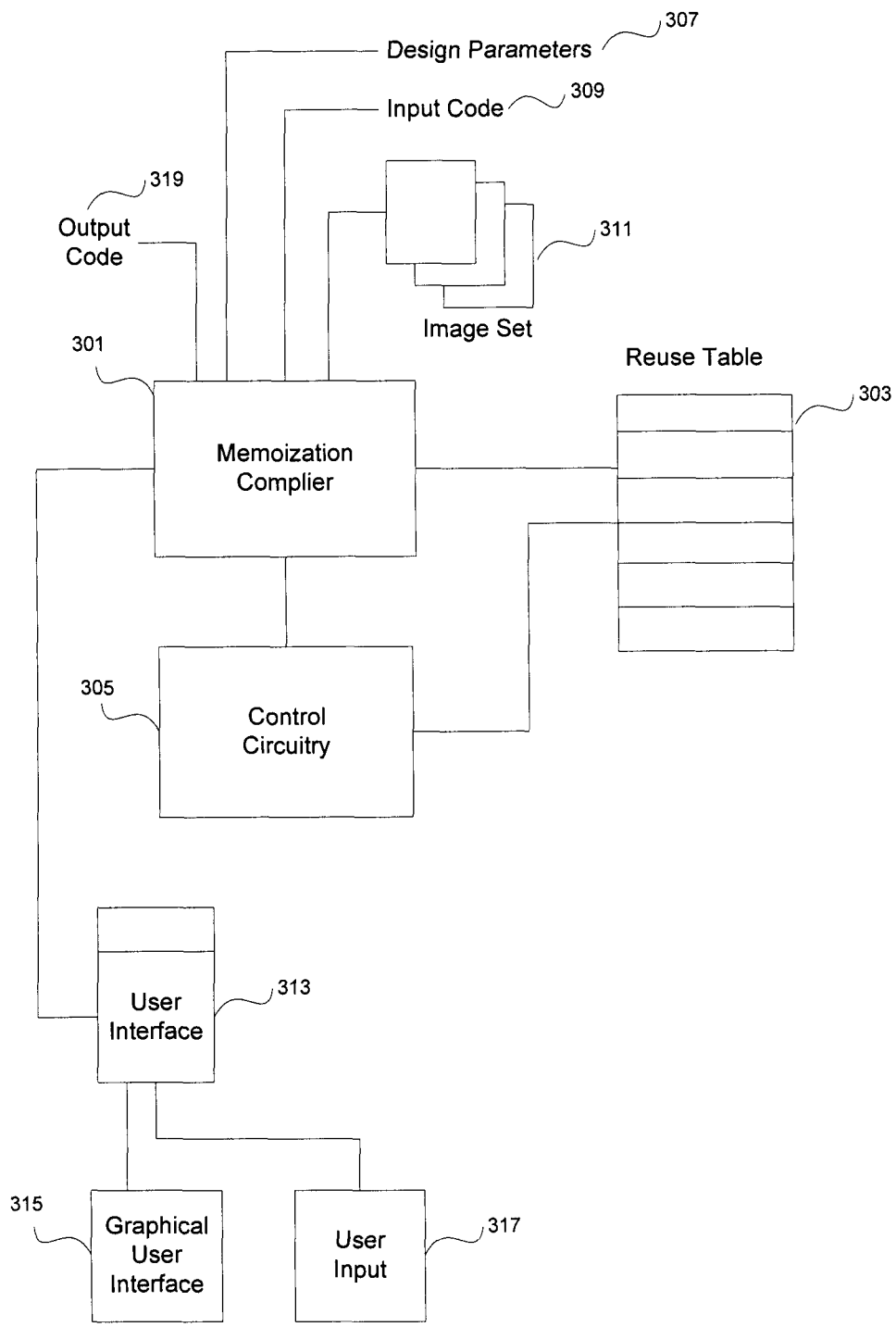
FIG. 3 illustrates a hardware-based memoization module in accordance with the present invention.

FIG. 3 illustrates a hardware-based memoization module in accordance with the present invention. A memoization module (301) includes or is linked to a reuse table (303) and control circuitry (305). The reuse table (303) may be provided by a memory for storing the results of previously performed computations. One or more design parameters (307), input code (309) embodying one or more image processing algorithms and a set of one or more images (311) may be inputted to the memoization compiler (301). The memoization compiler (301) outputs output code (319) that embodies a specific window memoization routine or technique that is an optimization of the input code operable to provide improved performance to apply by other processing hardware or software, which is again input to the memoization compiler. A user interface (313), which may include or be linked to a graphical user interface (315) and user input (317) for user intervention may also be provided, for example to initiate the optimization provided by the memoization compiler.

The reuse table of the memoization module may be a dual port memory array (one read and one write port), which may be used to store the strings of incoming windows and the corresponding responses. The control circuitry is responsible for mapping the strings of the incoming windows into the reuse table and determining whether there is a matching string in the reuse table for each incoming window. Depending on whether a hit or miss occurs, the control circuitry is also responsible for stalling the pipeline and deciding which window can enter the core and updating the reuse table with the response of windows generated by the core.

Figure 4:
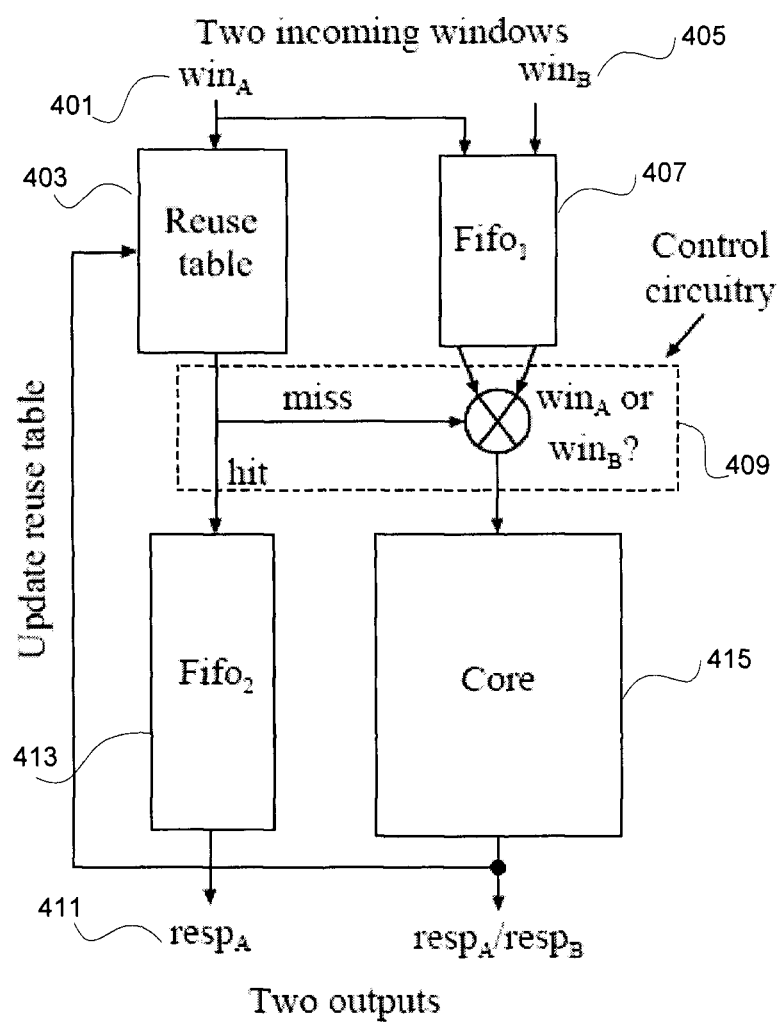
FIG. 4 illustrates a memoization module based on a 2-wide superscalar pipeline.

FIG. 4 illustrates a memoization module based on a 2-wide superscalar pipeline. The memoization module may accept two windows of pixels as inputs at each clock cycle. One window, $win_A$ (401), tries to find a matching string in the reuse table (403) while the other window, $win_B$ (405), is sent through a fifo (Fifo$_1$) (407) to keep both windows in sync. By the time winB (405) exits Fifo$_1$ (407), control circuitry (409) determines whether a hit or miss has occurred for $win_A$ (401). In case of a hit, the control circuitry (409) sends the response of $win_A$ (401), $resp_A$ (411), which has already been looked up from the reuse table (403), through Fifo$_2$ (413) and at the same time, $win_B$ (405) is sent to the core (415). Fifo$_2$ (413) ensures that the responses of both input windows ($resp_A$ and $resp_B$) exit the pipeline at the same clock cycle. In other words, in case of a hit, the pipeline is able to fetch and output two windows per clock cycle.

If the control circuitry (409) determines that $win_A$ (401) was not able to locate a matching string in the reuse table (403) (miss), then both windows require using the same resource (core) at the same time, causing a structural hazard. To solve the structural hazard, the control circuitry stalls the pipeline; $win_A$ (401) may be sent to the core, followed by $win_B$ (405). As a result, the two responses ($resp_A$ and $resp_B$) may exit the pipeline in two consecutive clock cycles. In other words, in case of a miss, the pipeline is able to fetch and output only one window per clock cycle. Finally, the reuse table (403) is updated with the string and response of either $win_A$ or $win_B$, depending on the design.

In this architecture, only one input window (i.e. $win_A$) is checked against the reuse table. It may seem that checking both input windows against the reuse table can increase hit rate. However, for each pair of input windows, the increase in throughput is the same if either one window hits the reuse table or both windows hit. The reason is that the pipeline can accept at most two input windows per cycle, regardless of the number of hits for a pair of windows. On the other hand, adjacent windows are usually similar in an image. Therefore, if one window hits (misses) the reuse table, it is very likely that its adjacent window will also hit (miss) the reuse table. Thus, in order to make control circuitry simple, it only checks one input window against the reuse table.

The speedup of a 2-wide superscalar pipeline with respect to a scalar pipeline can be calculated as:

$$\text{speedup} = \frac{cyc_{scalar}}{cyc_{superscalar}} \quad (25)$$

where $cyc_{scalar}$ and $cyc_{superscalar}$ cycsuperscalar are the number of clock cycles that the scalar pipeline and the superscalar pipeline require to fetch all parcels of data, respectively. In deriving equation 25, it is assumed that both pipelines process the same number of parcels of data and both have the same clock speeds.

For a scalar pipeline, assuming that there is no data dependency between the operations, the total number of clock cycles required to fetch all parcels of data, pcl, is equal to the total number of the parcels.

$$cyc_{scalar} = pcl \quad (26)$$

For a 2-wide superscalar pipeline with window memoization, depending on the mapping scheme used, the pipeline has to stall for some cycles in order to access (read from and/or write to) the reuse table. Assuming that on average, in case of a hit or miss, the number of cycles that the pipeline has to stall due to memory access is $mem_{stall}$ (memory stall), and that $HR_{hw}^{pair}$ is the number of input pairs of windows that find a matching string in the reuse table divided by the total number of pairs of windows that enter the pipeline, then if a hit occurs, the pipeline requires one clock cycle to fetch one pair of windows and $mem_{stall}$ clock cycles to access the reuse table. Therefore, the total number of clock cycles required to fetch the pairs of windows, for which a hit will occur is:

$$\text{cyc}_{hit} = HR_{hw}^{pair} \times \frac{pcl}{2} \times (1 + \text{mem}_{stall}) \quad (27)$$

where pcl is the total number of windows and thus, pcl/2 is the total number of pairs of windows that enter the pipeline. In case of a miss, the pipeline requires two clock cycles to fetch one pair of windows (because pipeline must stall and both windows must go through the core) and memstall clock cycles to access the reuse table. Therefore, the total number of clock cycles required to fetch the pairs of windows, for which a miss will occur is:

$$\text{cyc}_{miss} = (1 - HR_{hw}^{pair}) \times \frac{pcl}{2} \times (2 + \text{mem}_{stall}) \quad (28)$$

The total number of clock cycles required to fetch all pairs of windows will be:

$$\begin{aligned}
\text{cyc}_{superscalar} &= \text{cyc}_{hit} + \text{cyc}_{miss} \quad (29) \\
&= HR_{hw}^{pair} + \frac{pcl}{2} \times (1 + \text{mem}_{stall}) + \\
&\quad (1 - HR_{hw}^{pair}) \times \frac{pcl}{2} \times (2 + \text{mem}_{stall}) \\
&= \frac{pcl}{2} \times (2 + \text{mem}_{stall} - HR_{hw}^{pair})
\end{aligned}$$

Equation (29) can be written in terms of $HR_{hw}$; the number of input windows that find a matching string in the reuse table divided by the total number of windows that enter the pipeline. In the 2-wide superscalar pipeline with window memoization, for each pair of input windows at most only one hit can occur. In other words, out of two incoming windows, only one is checked against the reuse table. The other window is always sent to the core. Therefore, the number of hits for both single windows and pairs of windows is the same. However, hit rate for pairs of windows (i.e. $HR_{hw}^{pair}$) is calculated with respect to the total number of pairs of input windows while hit rate for single windows (i.e. $HR_{hw}$) is calculated with respect to the total number of single input windows, which means: $HR_{hw}^{pair} = 2 \times HR_{hw}$. In other words, for a 2-wide superscalar pipeline with window memoization, the maximum hit rate may be 50% (i.e. $HR_{hw} = 50\%$). Therefore, equation 29 can be rewritten as:

$$\text{cyc}_{superscalar} = pcl \times \left(1 + \frac{\text{mem}_{stall}}{2} - HR_{hw}\right) \quad (30)$$

Substituting equations 26 and 30 into the speedup equation (equation 25) gives:

$$\begin{aligned}
\text{speedup} &= \frac{pcl}{pcl \times \left(1 + \frac{\text{mem}_{stall}}{2} - HR_{hw}\right)} \quad (31) \\
&= \frac{1}{1 + \frac{\text{mem}_{stall}}{2} - HR_{hw}}
\end{aligned}$$

Equation 31 is the speedup equation for a 2-wide superscalar pipeline with window memoization with respect to a scalar pipeline.

Similarly, the sprawl of a 2-wide superscalar pipeline with respect to a scalar pipeline can be determined. The sprawl of a 2-wide superscalar pipeline with respect to a scalar pipeline can be calculated as:

$$\text{sprawl} = \frac{\text{area}_{superscalar}}{\text{area}_{scalar}} \quad (32)$$

where $\text{area}_{superscalar}$ and $\text{area}_{scalar}$ are the hardware area consumed by the superscalar pipeline and scalar pipeline, respectively. For a scalar pipeline, $\text{area}_{scalar}$ is the total number of logic elements consumed by the pipeline, which we call $LE_{core}$.

$$\text{area}_{scalar} = LE_{core} \quad (33)$$

For a 2-wide superscalar pipeline with window memoization, in addition to the core, the pipeline also includes the memoization mechanism, which consists of the control circuitry, the reuse table and two fifos. Therefore, the total hardware area consumed by a 2-wide superscalar pipeline with window memoization will be:

$$\text{area}_{superscalar} = LE_{core} + LE_{ctl} + 0.06 \times \text{mem}_{bits} \quad (34)$$

where $LE_{core}$ and $LE_{ctl}$ are the number of logic elements consumed by the core and control circuitry, respectively. $\text{mem}_{bits}$ is the total number of memory bits used by the reuse table and the two fifos. In equation 5.20, the coefficient 0.06 reflects the fact that the hardware area that each memory bit in an FPGA consumes is equal to 6% of the area consumed by one logic element in the FPGA.

Substituting equations 33 and 34 into the sprawl equation (equation 32) gives:

$$\text{sprawl} = \frac{LE_{core} + LE_{ctl} + 0.06 \times \text{mem}_{bits}}{LE_{core}} \quad (35)$$

Equation 35 is the sprawl equation for a 2-wide superscalar pipeline with window memoization with respect to a scalar pipeline.

The factors that affect speedup are the mapping scheme used by the control circuitry, the core latency, and the reuse table size. The effect of the reuse table size on hit rate and hence on speedup is obvious. A larger reuse table will produce a higher hit rate. Sprawl is affected by the sizes of the reuse table and fifos, the control circuitry, and the core. The control circuitry is responsible for mapping the strings of incoming windows into the reuse table using a mapping scheme, determining whether a hit or miss occurs, stalling the pipeline (in case of a miss), and updating the reuse table. The reuse table stores the strings and responses of windows and the two fifos keep the windows in order throughout the pipeline. The core size is the hardware area consumed by the original scalar pipeline, and finally, the core latency is the number of clock cycles from the input of the core to its output.

The equation for speedup (equation 31) indicates that in addition to hit rate ($HR_{hw}$), the number of pipeline stalls caused by the reuse table access ($\text{mem}_{stall}$) also affects speedup. For a 2-wide superscalar pipeline with window memoization, with the maximum hit rate (i.e. $HR_{hw} = 50\%$), in order to achieve a speedup of at least 1, $\text{mem}_{stall}$ must be equal to or less than 1. In reality, hit rate is usually below 50% (e.g. 35%), which means that $\text{mem}_{stall}$ larger than 0 may lead to speedups below 1. Therefore, the mapping scheme for a 2-wide superscalar pipeline with window memoization should not impose any extra pipeline stalls. Among the three mapping schemes in processor cache hierarchy design (i.e. direct-mapped, fully associative, and set-associative), only direct-mapped mapping scheme is able to give mem$_{stall}$ of 0 for the hardware-based memoization module. Fully associative and set-associative mapping schemes require multiple clock cycles in order to map/read an entry into/from memory. As a result, the hardware-based memoization module may implement a direct-mapped mapping scheme.

The core latency causes the response of a window to be generated and the reuse table to be updated a few cycles after the window enters the pipeline. On the other hand, many similar windows in an image are usually located very close to each other. This is due to the fact that neighboring windows usually belong to one object or background in the image and hence, they often contain similar pixels. When the immediate following windows, which are probably similar to the current window, enter the pipeline, the reuse table has not been updated yet with the response of the current window. As a result, many potential hits are turned into misses. In order to eliminate the effect of the core latency on hit rate, a two level reuse table may be provided.

Figure 5:
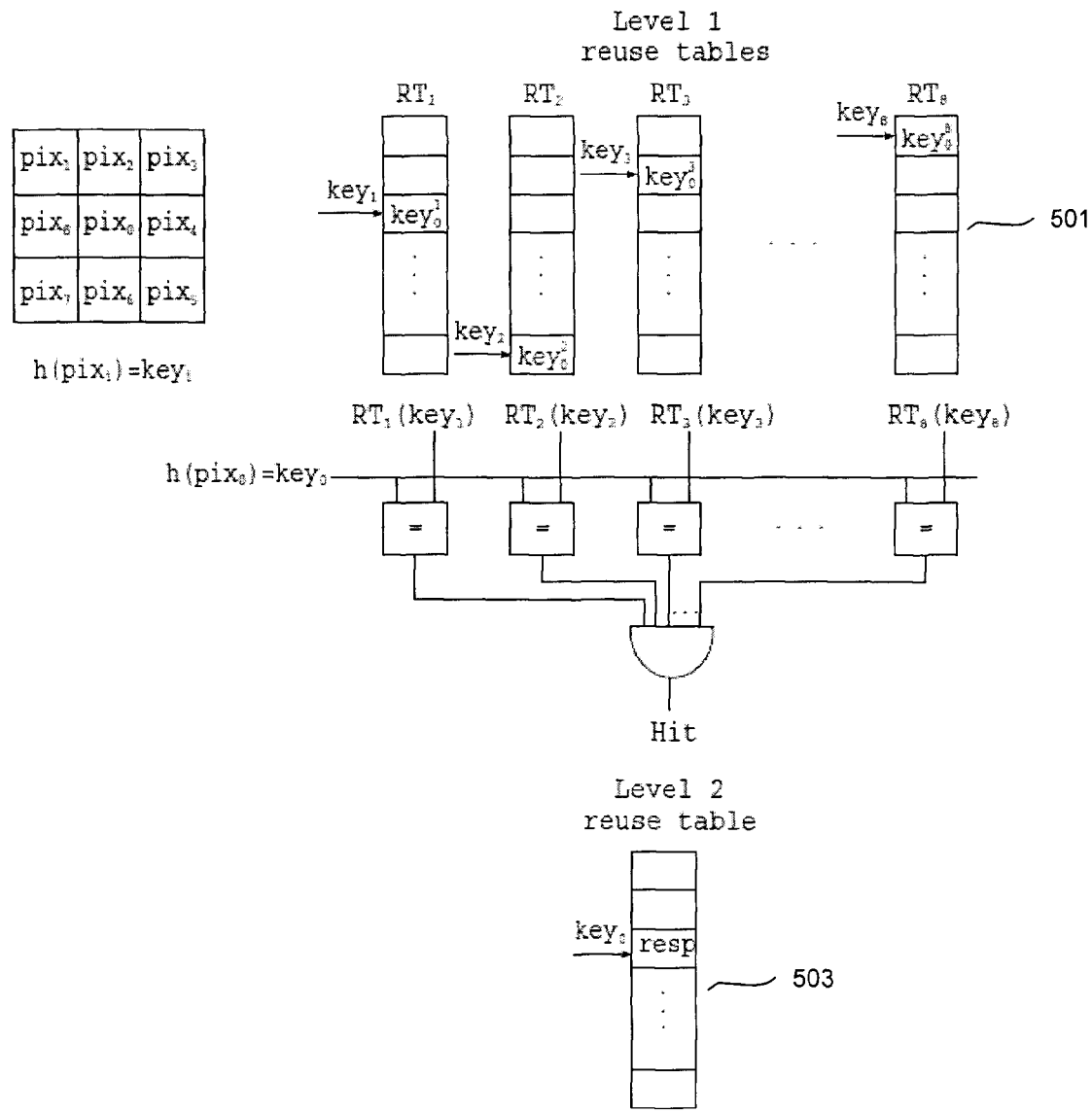
FIG. 5 illustrates a memoization module implementing a two level reuse table.

FIG. 5 illustrates a memoization module implementing a two level reuse table. The level 1 reuse table (501), which is located at the top of the pipeline stores the strings of the incoming windows and the level 2 reuse table (503), which is located at the bottom of the pipeline stores the responses of the incoming windows. When a window enters the pipeline for the first time, its string is inserted into the level 1 reuse table immediately while it takes a few cycles, due to the core latency, to generate the response of the window and update the level 2 reuse table. As a result, as soon as another window enters the pipeline, it is determined whether a hit or miss occurs. Nevertheless, the response is actually reused (looked up) a few cycles later. This enables a current window to find a matching string that belongs to windows that are spatially close to the current window, eliminating the effect of the latency of the core on hit rate and leading to high speedups.

To obtain small sprawl, the reuse tables must be space-efficient. Where the memoization module implements direct-mapping, a portion of each incoming window's string may be used as an address to the reuse table while the remaining bits of string along with the response of the window may be stored in the reuse table. The conventional implementations of the reuse table usually consume a large amount of hardware area leading to high sprawls. To achieve low sprawls, we present a space-efficient architecture for the reuse table, which is based on parallel Bloom filters.

A space-efficient architecture for the reuse table may be based on parallel Bloom filters to consume a considerably smaller number of bits compared to conventional architectures. It yields high hit rates with a small number of false positive hits. As opposed to regular parallel Bloom filters where each entry is a single bit, the reuse table of the present invention enables each entry to comprise multiple bits. Having wider entries reduces the probability of false positives.

To reduce the amount of hardware area that the reuse table consumes, for the level 1 reuse table, multiple memory arrays in parallel may be used, rather than a single memory array. The level 2 reuse table may use a single memory array as before. For windows of m×m pixels, m$^2$-1 reuse tables ($RT_1$, $RT_2$, ..., $RT_{m^2;1}$) are used to store the strings of the windows (i.e. the level 1 reuse tables). For each pixel in the window ($pix_i$), except the central pixel, there is a corresponding reuse table ($RT_i$). From each pixel $pix_i$, a hash key is generated as an address to each corresponding reuse table $RT_i$. As shown in FIG. 5, a portion (or the whole) of the central pixel in the window is stored in all reuse tables, in locations where the corresponding hash keys point. In order to check whether a current window matches a string already stored in the level 1 reuse tables, first, the contents of all level 1 reuse tables at locations where the corresponding hash keys of the current window point to (i.e. $RT_1(key_1)$, $RT_2(key_2)$, ..., $RT_8(key_8)$) are read. If all the values read from the level 1 reuse tables are equal to the hash key of the central pixel of the current window ($key_0$), then a hit occurs. Otherwise, a miss will occur. In case of a hit, the response is read from the level 2 reuse table, using $key_0$ as the address. The response of the window is stored in a separate reuse table (level 2 reuse table) whose address is a hash key generated from a certain pixel in the window (e.g. central pixel). Furthermore, the address to the level 2 reuse table that holds responses could be extracted from any pixel in the window so along as the same pixel is used all the time. To insert the string of a window into the reuse tables, the hash key generated from the central pixel $key_0$ is inserted to the level 1 reuse tables at locations where the corresponding hash keys of the current window point to (i.e. $RT_1(key_1)$, $RT_2(key_2)$, ..., $RT_8(key_8)$). To insert the response of a window into the level 2 reuse table, $key_0$ is used as the address to the level 2 reuse table.

Figure 6:
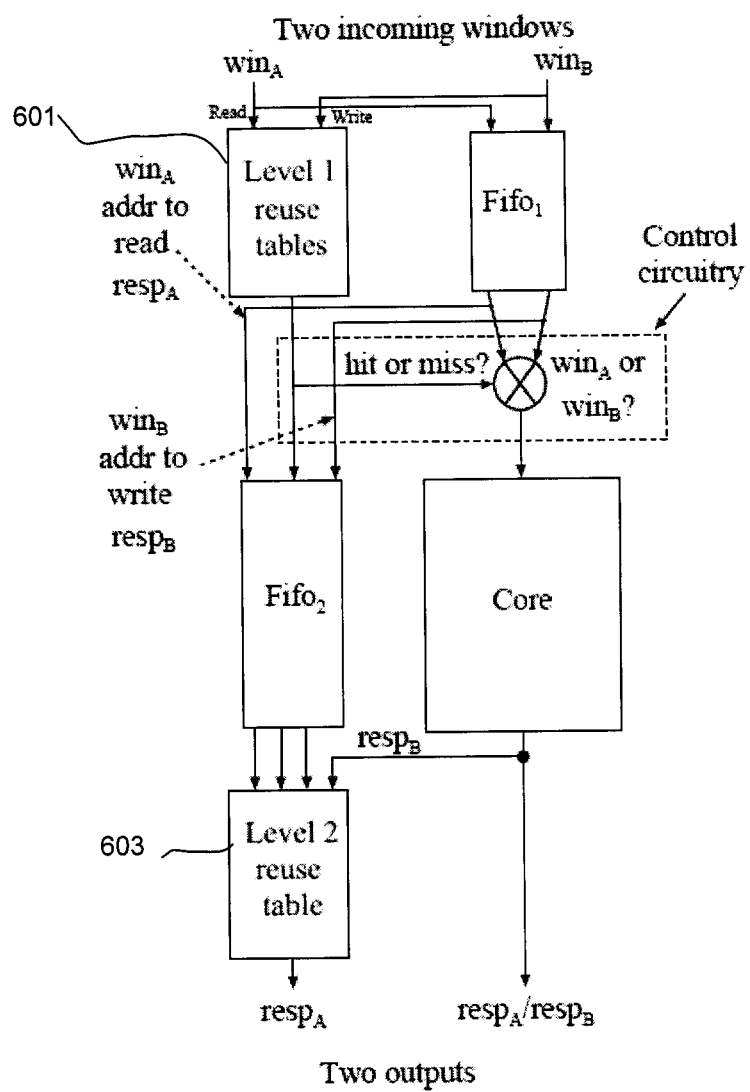
FIG. 6 illustrates an optimized architecture of the memoization module as a 2-wide superscalar pipeline with window memoization in hardware with a 2-level reuse table.

FIG. 6 illustrates an optimized architecture of the memoization module as a 2-wide superscalar pipeline with window memoization in hardware with a 2-level reuse table. Similar to the architecture illustrates in FIG. 4, the present architecture includes one core to implement the image processing algorithm, control circuitry, two fifos ($Fifo_1$ and $Fifo_2$). However, a level 1 reuse table (601) and level 2 reuse table is provided (603). At each cycle, two windows enter the pipeline: $win_A$ and $win_B$. Out of each pair of input windows ($win_A$ and $win_B$), one window (i.e. $win_A$) is always checked against the level 1 reuse tables to determine whether there is a matching string in the reuse table. The other window (i.e. $win_B$) is always sent to the core and never checked against the reuse table. As a result, the level 1 reuse tables are always read by $win_A$ and in case of a hit, the level 2 reuse table is also read by $win_A$. On the other hand, the level 1 and the level 2 reuse tables are always updated with the string and response of $win_B$, respectively.

At the same cycle that $win_A$ is checked against the level 1 reuse tables, the string of $win_B$ is written into the level 1 reuse tables. At this stage, the response of $win_B$ has not been generated yet. Both windows are also sent through $Fifo_1$ in order to keep them in sync with the flow of the pipeline. By the time that the control circuitry determines whether $win_A$ has found a matching string in the level 1 reuse tables, both windows have exited Fifo1. In case of a hit, $win_B$ is sent to the core and the central pixel of $win_A$ is sent through Fifo2 to be used as the address to the level 2 reuse table to look up the response of $win_A$ ($resp_A$). When the core generates the response of $win_B$ ($resp_B$), $resp_A$ has also been read from the level 2 reuse table. Therefore, both responses exit the pipeline at the same cycle. Finally, the level 2 reuse table is updated by $resp_B$, at the location where the central pixel of $win_B$ points to. If $win_A$ is not able to find a matching string in the level 1 reuse tables (miss) the pipeline stalls to prevent new windows from entering the pipeline. In the stalled cycle, $win_A$ is sent to the core first to generate its response ($resp_A$). Following $win_A$, $win_B$ is also sent to the core to generate $resp_B$. The responses of both window will exit the core consecutively in two cycles. The level 2 reuse table is updated by $resp_B$. It should be noted that in this architecture, regardless of whether a miss or hit occurs, the reuse tables are updated by only $win_B$ and its response $resp_B$. In case of hit, $win_A$ is already in the reuse tables and thus, it is beneficial to update the reuse tables with a new information, $win_B$. In case of miss, if the reuse tables are updated by $win_A$ instead of $win_B$, the control circuitry will be slightly less complicated compared to the scenario where the reuse tables are updated only by $win_B$. However, our simulations show that updating the reuse tables by $win_A$ (in case of a miss) decreases hit rate (and hence speedup) slightly. Therefore, the overall efficiency of the design remains essentially unchanged regardless of the design decision.

The efficiency of the hardware design can be defined as the ratio of the performance of the design (perf) and the hardware area cost of the design (area).

$$\text{efficiency} = \frac{perf}{area} \quad (36)$$

The performance of a hardware design is characterized by throughput, which is measured as the number of parcels of data that is produced by the design per unit time.

The cost of a hardware design is measured based on the amount of hardware area that the design consumes. In ASIC design, the consumed hardware area is measured based on the amount of the silicon area that the design uses. In FPGA design, the consumed hardware area is measured based on the number of FPGA cells (or logic elements) and memory bits used by the design. In order to unify the amount of hardware area consumed by logic elements and memory bits, the area consumed by memory bits is measured in terms of the hardware area consumed by logic elements. It is estimated that the hardware area that each memory bit in an FPGA consumes is equal to 6% of the area consumed by one logic element in the FPGA.

Equation 36 represents the effectiveness of one design independent of any other design. In many cases, it is required to measure the relative efficiency of an optimized design with respect to the original design (or base design). Relative efficiency ($eff_{Rel}$) can be defined as the ratio of the efficiencies of the optimized design ($eff_{Opt}$) and the base design ($eff_{Base}$).

$$eff_{Rel} = \frac{eff_{Opt}}{eff_{Base}} \quad (37)$$

By substituting the efficiency of the optimized and base design from equation 36 into equation 37 and considering that the performance of a design is characterized by throughput, $eff_{Rel}$ can be found to be:

$$eff_{Rel} = \frac{\frac{thru_{Opt}}{thru_{Base}}}{\frac{area_{Opt}}{area_{Base}}} \quad (38)$$

The ratio in the numerator of equation 38 (i.e.

$$\left(i.e. \frac{thru_{Opt}}{area_{Base}}\right)$$

is in fact the speedup of the optimized design with respect to the base design.

$$\text{speedup} = \frac{thru_{Opt}}{thru_{Base}} \quad (39)$$

The ratio in the denominator of equation 38

$$\left(i.e. \frac{area_{Opt}}{area_{Base}}\right)$$

indicates the amount of increase in hardware area cost in the optimized design with respect to the base design. Sprawl is the increase in the hardware area of the optimized design with respect to the base design, which is calculated as:

$$\text{sprawl} = \frac{area_{Opt}}{area_{Base}} \quad (40)$$

The equation for relative efficiency (equations 38) can be rewritten in terms of speedup and sprawl (equations 39 and 40).

$$eff_{Rel} = \frac{speedup}{sprawl}. \quad (41)$$

Equation 41 evaluates the relative efficiency of an optimized design with respect to a base design considering both speedup and sprawl. In many real-world applications, the defining factor for the hardware design is both performance requirements and hardware area limitations. Therefore, when comparing two designs, it is important to consider the performance improvements achieved by the designs (i.e. speedup) and the cost that each design had to pay in order to achieve the performance improvements (i.e. sprawl).

In digital hardware design, pipelining is a fundamental optimization technique, which increases the throughput of a design by overlapping the execution of operations. A pipeline usually contains two parts: datapath and control circuitry. The datapath is responsible for performing some operations on each parcel of data that enters the pipeline to produce an output parcel. The control circuitry is in charge of handling the internal states of the pipeline based on inputs.

The reason that the throughput of a superscalar (scalar) pipeline is not always n (1) is that due to different hazards in a pipeline (i.e. structural, data, and control hazard), the pipeline is not able to fetch new parcels of data at each clock cycle. In order to resolve the hazards, the pipeline must stall and stop fetching new parcels of data for some clock cycles.

Figure 7:
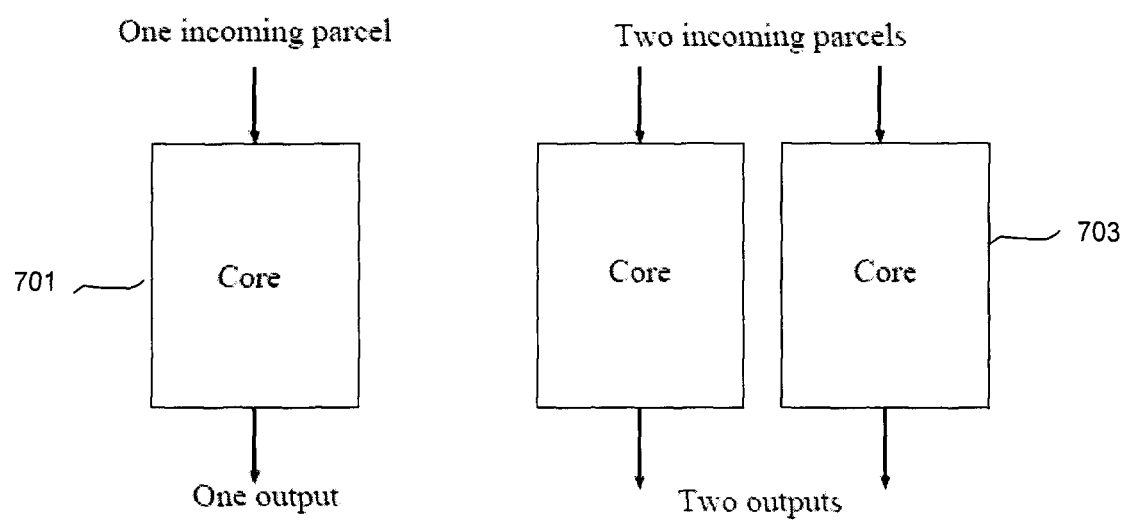
FIG. 7 illustrates a scalar pipeline and a 2-wide superscalar pipeline.

An n-wide superscalar pipeline is created by replicating the hardware of a scalar pipeline for n times. FIG. 7 illustrates a scalar pipeline and a 2-wide superscalar pipeline. The 2-wide superscalar pipeline (703) is created by duplicating the hardware of the scalar pipeline (701). As it can be seen from the figure, the 2-wide superscalar pipeline can fetch and output at most 2 parcels of data per clock cycle. Note that in FIG. 7, core represents the hardware of the base design or the scalar pipeline.

Equation 41 can be used to calculate the relative efficiency of an n-wide superscalar pipeline with respect to the scalar pipeline on which the superscalar pipeline has been based. In doing so, the speedup and sprawl of the n-wide superscalar pipeline must be calculated with respect to the scalar pipeline. As equation 39 indicates, speedup is calculated as the ratio of the throughput of the superscalar pipeline (optimized design) to the scalar pipeline (base design).

$$\text{speedup} = \frac{\text{thru}_{superscalar}}{\text{thru}_{scalar}} \quad (42)$$

In calculating throughput, if it is assumed that the clock speed of the two designs under study (i.e. scalar and superscalar pipelines) are the same, instead of seconds, the clock cycle of the pipeline can be used as unit time. Thus, the throughput of a pipeline can be written as:

$$\text{thru} = \frac{pcl}{cyc} \quad (43)$$

In the equation above, pcl represents the total number of parcels of data that enter the pipeline and cyc is the total number of clock cycles elapsed to fetch all pcl parcels of data. When comparing a superscalar pipeline to a scalar pipeline, the total number of parcels of data that enter both pipelines can be assume to be equal. Therefore, the speedup equation (equation 42) can be rewritten as:

$$\text{speedup} = \frac{\frac{pcl}{cyc_{superscalar}}}{\frac{pcl}{cyc_{scalar}}} = \frac{cyc_{scalar}}{cyc_{superscalar}} \quad (44)$$

As the equation above indicates, the speedup of an n-wide superscalar pipeline with respect to a scalar pipeline, assuming that both pipelines process the same amount of data with equal clock speeds, is equal to the ratio of the total number of clock cycles that the scalar pipeline and the superscalar pipeline require to fetch all parcels of data.

As equation 40 indicates, sprawl of a n-wide superscalar pipeline with respect to a scalar pipeline is calculated as the ratio of the hardware area consumed by the superscalar pipeline (area$_{superscalar}$) to scalar pipeline (area$_{scalar}$).

$$\text{sprawl} = \frac{\text{area}_{superscalar}}{\text{area}_{scalar}} \quad (45)$$

A conventional n-wide superscalar pipeline usually yields a maximum relative efficiency of 1 because it speeds up the computations at most by a factor of n with respect to a scalar pipeline and at the same time, it consumes almost n times the hardware area that a scalar pipeline does. In contrast, an n-wide superscalar pipeline with window memoization gives a relative efficiency larger than 1. This means that the memoization module can improve performance with a cost (hardware area) which is less than that of conventional techniques.

The hardware-based memoization module can be modeled to determine speedup, sprawl and accuracy results. Both speedup and sprawl can be calculated for a 2-wide superscalar pipeline with window memoization for a case study algorithm and compared to the scalar pipeline of the case study algorithm. Speedup is independent of the case study algorithm and it only depends on the input images. Sprawl depends on the hardware area consumed by the scalar pipeline of the case study algorithm (core) and the memoization mechanism. Finally, accuracy of results depends on both the case study algorithm and the input images.

Both the scalar pipeline and 2-wide superscalar pipeline with window memoization can be implemented at the register-transfer-level (RTL) using VHDL on an FPGA. An example of image processing algorithms for input to the memoization module is the Kirsch edge detector and median filter. These two algorithms consume small hardware area compared to other algorithms used as case studies in software. Therefore, they give the upper-bound for sprawl (small $LE_{core}$ in equation 35) and thus, the lower-bound for the efficiency. Moreover, these algorithms produce both binary and gray-level outputs, which enables the evaluation of accuracy for both classes of results. Simulations can be run to calculate the speedups obtained for four sets of images (natural, industrial, medical, and barcode images). In addition, the sprawl of each design can been calculated using the number of logic elements and memory bits reported by a synthesis tool. The clock speeds for all designs, including the two cores (i.e. scalar pipelines for Kirsch and median) and the two 2-wide superscalar pipelines with window memoization for Kirsch and median should be configured to be the same, for example at 235 MHz.

Figure 10:
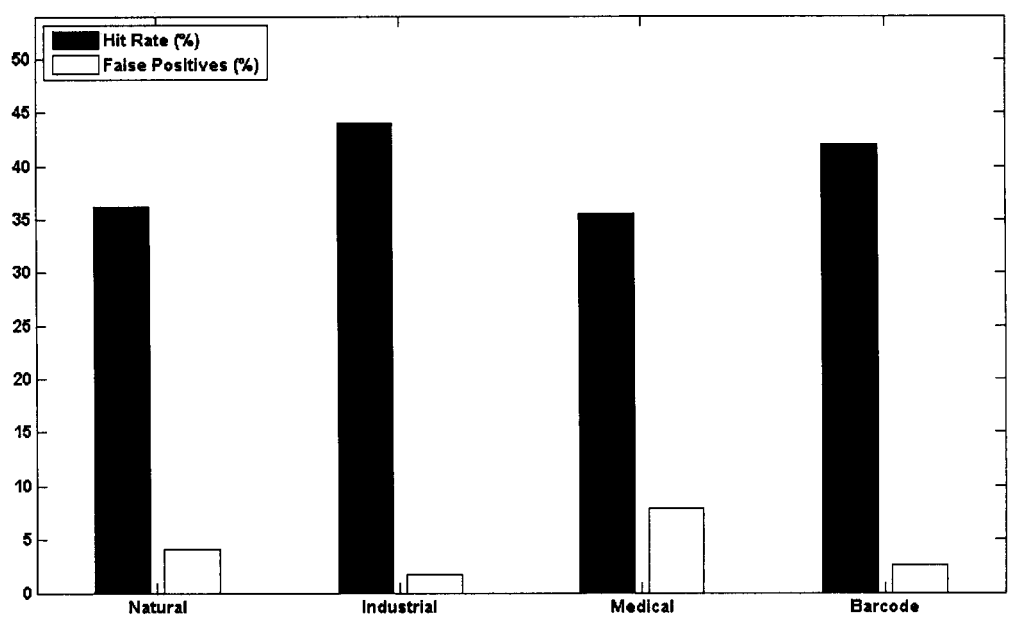
FIG. 10 illustrates the average hit rates and false positives for each set of images.

FIG. 10 illustrates the average hit rates and false positives for each set of images. Speedup is calculated based on hit rate using the equation below:

$$\text{speedup} = \frac{1}{1 - HR_{hw}} \quad (5.31)$$

Table 2 shows the average speedups and accuracy of the results for each of the sets of images for the Kirsch edge detector and median filter. To calculate the accuracy of the results, for the Kirsch edge detector, misclassification error (equation 24) can be used and for median filter, signal-to-noise ratio can be used.

TABLE 2

Average speedups and results accuracy for in hardware

| Images | Natural (40) 512 × 512 | Industrial (8) 512 × 512 | Medical (30) 400 × 280 | Barcode (50) 640 × 480 |
|---|---|---|---|---|
| Speedup | 1.58 | 1.80 | 1.55 | 1.73 |
| Kirsch: Accuracy | 98.70% | 99.34% | 97.21% | 98.63% |
| Median: SNR | 33.85 | 37.08 | 29.40 | 37.35 |

The sprawls for the Kirsch edge detector and median filter are 1.12 and 1.17, respectively. In other words, the hardware area cost incurred by the 2-wide superscalar pipeline with window memoization is 12% and 17% of the original scalar pipelines. Consequently, Kirsch edge detector gives higher relative efficiencies because its sprawl is lower than that of median filter. The relative efficiency for both algorithms is between 1.33 and 1.60.

The invention claimed is:

1. A computer-implemented method for providing automated window memoization, the method comprising inputting to a memoization compiler an image set comprising one or more images consisting of pixels, input code implementing one or more image processing algorithms, and one or more design parameters, segmenting, the one or more images into a plurality of windows, wherein each window in the plurality of windows comprises one or more pixels of the one or more images; generating a string, by the compression and hashing engine, based on each window in the plurality of windows, the string corresponding to the respective window in the plurality of windows; applying one or more image processing algorithms to one or more windows in the plurality of windows, wherein the corresponding string of each of the one or more windows does not match existing content of a reuse table; and dynamically configuring the one or more design parameters to optimize the one or more image processing algorithms by reducing computational redundancy when applying the one or more image processing algorithms to the image set.

2. The method of claim 1, wherein a result is determined by application of the one or more image processing algorithms to each of the one or more windows, and stored in the reuse table with the string corresponding to the respective window of the one or more windows.

3. The method of claim 2, further comprising determining the string corresponding to each respective window in the plurality of windows based on one or more significant bits of each pixel of the respective window; and a memory address corresponding to each string; wherein the memory address is associated with a memory location of the reuse table.

4. The method of claim 3, further comprising checking, for each string, whether any memory location of the reuse table is associated with the string and, if and when a memory location of the reuse table is associated with the string, obtaining a previously stored result from the memory location of the reuse table.

5. The method of claim 4, wherein in one or more design parameters comprises a hit rate and reducing computational redundancy comprises maximizing the hit rate, the hit rate based on the proportion of previously stored results obtainable from one of the memory locations for the windows of one or more images.

6. The method of claim 3, applying the one or more image processing algorithms to the one or more windows in the plurality of windows comprises (a) determining, for each string corresponding to each respective window in the plurality of windows, whether any memory location of the reuse table is associated with the string; (b) if none of the memory locations of the reuse table are associated with the string applying the one or more image processing algorithms to the respective corresponding window to obtain the result; and (c) storing the string and the result to the memory location of the reuse table associated with the memory address.

7. The method of claim 1, wherein the memoization compiler processes the image set for the one or more image processing algorithms and dynamically configures the one or more design parameters to optimize the one or more image processing algorithms.

8. The method of claim 1, wherein the memoization compiler is a hardware-based memoization module.

9. A system for providing automated window memoization, the system comprising a memoization compiler, a compression and hashing engine linked to the memoization compiler, and a reuse table included in or linked to the memoization compiler, the system configured to:
(a) receive as input, by the memoization compiler, 1) an image set comprising one or more images consisting of pixels, 2) input code configured to implement one or more image processing algorithms, and 3) one or more design parameters;
(b) segment, by the memoization compiler, the one or more images into a plurality of windows, wherein each window in the plurality of windows comprises one or more pixels of the one or more images;
(c) generate a string, by the compression and hashing engine, based on each window in the plurality of windows, the string corresponding to the respective window in the plurality of windows;
(d) apply, by the memoization compiler, the one or more image processing algorithms to one or more windows in the plurality of windows, wherein the corresponding string of each of the one or more windows does not match existing content of the reuse table; and
(e) dynamically configure, by the memoization compiler, the one or more design parameters to optimize the one or more image processing algorithms by reducing computational redundancy when applying the one or more image processing algorithms to the image set.

10. The system of claim 9, wherein a result is determined by application of the one or more image processing algorithms to each of the one or more windows, and stored in the reuse table with the string corresponding to the respective window of the one or more windows.

11. The system of claim 10, wherein the compression and hashing engine is configured to determine the string corresponding to each respective window in the plurality of windows based on one or more significant bits of each pixel of the respective window, and a memory address corresponding to each string, wherein the memory address is associated with a memory location of the reuse table.

12. The system of claim 11, wherein the memoization compiler is configured to check, for each string, whether any memory location of the reuse table is associated with the string, and if and when a memory location of the reuse table is associated with the string, obtain a previously stored result from the memory location of the reuse table.

13. The system of claim 12, wherein the one or more design parameters comprise a hit rate, and reducing computational redundancy comprising maximizing the hit rate, the hit rate based on the proportion of previously stored results obtainable from one of the memory locations for the windows of one or more images.

14. The system of claim 11, wherein applying the one or more image processing algorithms to the one or more windows in the plurality of windows comprises:
(a) determining, for each string corresponding to each respective window in the plurality of windows, whether any memory location of the reuse table is associated with the string;
(b) if none of memory locations of the reuse table are associated with the string, applying the one or more image processing algorithms to the respective corresponding window in the plurality of windows to obtain the result; and
(c) storing the string and the result to the memory location of the reuse table associated with the memory address.

15. The system of claim 9, wherein the memoization compiler processes the image set for the one or more image processing algorithms and dynamically configures the one or more design parameters to optimize the one or more image processing algorithms.

16. The system of claim 9, wherein the memoization compiler is a hardware-based memoization module.

17. The system of claim 16, wherein the memoization module is implemented by an n-wide superscalar pipeline.

18. The system of claim 17, wherein the n-wide superscalar pipeline is a 2-wide superscalar pipeline.

19. The system of claim 9, wherein the one or more design parameters include at least one of: a hit rate, a memoization overhead cost, and a measure of similarity and comparability.

20. The system of claim 9, wherein the reuse table is a two level reuse table.

21. The system of claim 9, wherein the reuse table is an efficient memory based on parallel bloom filters.

* * * * *